US012583621B1

(12) United States Patent
Martini et al.

(10) Patent No.: US 12,583,621 B1
(45) Date of Patent: Mar. 24, 2026

(54) DEBRIS BARRIER FOR AIRCRAFT WINDOW ASSEMBLY AND METHOD

(71) Applicant: The Boeing Company, Arlington, VA (US)

(72) Inventors: David Ted Martini, Marysville, WA (US); Terry Douglas Rushing, Marysville, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/074,596

(22) Filed: Mar. 10, 2025

(51) Int. Cl.
B64F 1/00 (2024.01)
B64C 1/14 (2006.01)

(52) U.S. Cl.
CPC ............ B64F 1/005 (2013.01); B64C 1/1476 (2013.01)

(58) Field of Classification Search
CPC ..... B64C 1/1492; B64C 1/1476; B64F 1/005; A01M 1/24; A01M 1/04; A01M 1/08; A01M 1/106; A01M 2200/012; A01M 99/00
See application file for complete search history.

(56) References Cited

U.S. PATENT DOCUMENTS

| | | | | |
|---|---|---|---|---|
| 2,350,519 A * | 6/1944 | Olson | ................. | A01M 1/2016 43/119 |
| 2,655,404 A * | 10/1953 | Cash | ....................... | A01M 1/24 43/119 |
| 2005/0274060 A1* | 12/2005 | Lederle | ................... | A01M 1/24 43/132.1 |
| 2013/0161971 A1* | 6/2013 | Bugno | ................. | B64C 1/1484 296/97.2 |
| 2015/0146277 A1* | 5/2015 | Ash | ....................... | B64C 1/1492 359/275 |
| 2020/0220035 A1* | 7/2020 | Busscher | ............ | G02F 1/13338 |

* cited by examiner

*Primary Examiner* — Ashesh Dangol
(74) *Attorney, Agent, or Firm* — COATS & BENNETT, PLLC

(57) ABSTRACT

An aircraft window barrier and aircraft window assembly including the aircraft window barrier for impeding debris entry into aircraft multi-pane windows during aircraft construction, aircraft storage, and non-flight aircraft phases, and methods for installing the aircraft window barrier and forming the aircraft window assembly are disclosed.

20 Claims, 18 Drawing Sheets

102

100

INSTALL AIRCRAFT WINDOW BARRIER
INTO AIRCRAFT CABIN SIDEWALL RECESS

500

102 — INSTALL AIRCRAFT WINDOW BARRIER INTO AIRCRAFT CABIN SIDEWALL RECESS

104 — ESTABLISH LIGHT TRANSMISSIVITY GRADIENT IN THE AIRCRAFT WINDOW BARRIER

106 — ATTRACT UNWANTED DEBRIS FROM AIRCRAFT CABIN INTO BARRIER CAVITY

110 — RETAIN ATTRACTED DEBRIS IN REMOVABLE CARTRIDGE

DEBRIS BARRIER FOR AIRCRAFT WINDOW ASSEMBLY AND METHOD

TECHNOLOGICAL FIELD

The present disclosure generally relates to the field of aircraft window barriers. More specifically, the present disclosure relates to the field of preventing debris from entering window assemblies during production and storage of aircraft.

BACKGROUND

During aircraft production, aircraft storage, and aircraft delivery, an aircraft window assembly can risk entry of unwanted debris entering the installed aircraft window assemblies from an aircraft interior. Removal of unwanted debris trapped within an installed aircraft window assembly can require significant labor, time, and cost.

Unless explicitly identified as such, no statement herein is admitted as prior art merely by its inclusion in the Technological Field and/or Background section(s).

SUMMARY

A present aspect is directed to an aircraft window barrier for inhibiting entry of debris from an aircraft cabin into an aircraft multi-pane window, the aircraft window barrier comprising a barrier base, with the barrier base comprising a barrier base first side (referred to equivalently herein as a barrier base inner side), and a barrier base second side (referred to equivalently herein as a barrier base outer/exterior side, a barrier base cutout section extending from a portion of the barrier base first side to a portion of the barrier base second side, a highly light-transmissive barrier base panel dimensioned to occupy the barrier base cutout section, and with the barrier base further comprising a barrier base outer perimeter. The aircraft window barrier further comprises a barrier continuous sidewall, with the barrier continuous sidewall extending substantially vertically from the barrier base first side of the barrier base, with the barrier continuous sidewall comprising a barrier continuous sidewall first side (referred to equivalently herein as a barrier continuous sidewall inner side), and a barrier continuous sidewall second side (referred to equivalently herein as a barrier continuous sidewall outer/exterior side), with the barrier continuous sidewall second side comprising a barrier continuous sidewall second side perimeter. The aircraft window barrier further comprises a barrier second wall extending from the barrier base first side, said barrier wall comprising barrier second wall thickness (T1) extending from a barrier second wall first side to a barrier second wall second side, with the barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side. The aircraft window barrier further comprises a barrier cavity, with the barrier cavity bounded by a portion of the barrier base first side, a portion of the barrier continuous sidewall first side, the highly-light transmissive barrier base panel, and the barrier second wall first side, with the barrier cavity comprising a barrier cavity open end comprising a barrier cavity open end inner perimeter. The aircraft window barrier further comprises a barrier cavity cover, with the barrier cavity cover comprising a barrier cavity thickness extending from a barrier cavity cover first side to a barrier cover second side, with the barrier cavity cover further comprising at least one barrier cavity cover one-way through opening extending through the barrier cover thickness, with the barrier cavity cover comprising a barrier cavity cover outer perimeter dimensioned to closely match the match the barrier cavity open end inner perimeter, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%.

In another present aspect, the barrier cavity cover is a movable barrier cavity cover configured to move between an open position and a closed position.

In another present aspect, the barrier cavity cover is removably engageable with the aircraft window barrier.

In another present aspect, the barrier base, the barrier continuous sidewall, and the barrier second wall are translucent.

In another present aspect, the aircraft window barrier comprises an aircraft window barrier footprint configured to completely nest within an aircraft cabin window recess outer perimeter of an aircraft cabin window recess and is further configured to facilitate movement of a movable window cover between a movable window stowed position and a movable window deployed position.

In another present aspect, the barrier continuous sidewall second side perimeter comprises a barrier continuous sidewall seal, with the barrier continuous sidewall seal comprising a compressible foam material.

In another present aspect, the aircraft window further comprises a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity.

In another present aspect, removable cartridge footprint is dimensioned to be completely housed within the barrier cavity.

Another present aspect is directed to an aircraft comprising an aircraft window barrier for inhibiting entry of debris from an aircraft cabin into an aircraft multi-pane window, the aircraft window barrier comprising a barrier base, with the barrier base comprising a barrier base first side (referred to equivalently herein as a barrier base inner side), and a barrier base second side (referred to equivalently herein as a barrier base outer/exterior side), a barrier base cutout section extending from a portion of the barrier base first side to a portion of the barrier base second side, a highly light-transmissive barrier base panel dimensioned to occupy the barrier base cutout section, and with the barrier base further comprising a barrier base outer perimeter. The aircraft window barrier further comprises a barrier continuous sidewall, with the barrier continuous sidewall extending substantially vertically from the barrier base first side of the barrier base, with the barrier continuous sidewall comprising a barrier continuous sidewall first side (referred to equivalently herein as a barrier continuous sidewall inner side), and a barrier continuous sidewall second side (referred to equivalently herein as a barrier continuous sidewall outer/exterior side), with the barrier continuous sidewall second side comprising a barrier continuous sidewall second side perimeter. The aircraft window barrier further comprises a barrier second wall extending from the barrier base first side, said barrier wall comprising barrier second wall thickness (T1) extending from a barrier second wall first side to a barrier second wall second side, with the barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side. The aircraft window barrier further comprises a barrier cavity, with the barrier cavity bounded by a portion of the barrier base first side, a portion of the barrier continuous sidewall first side, the highly-light transmissive barrier base panel, and the barrier second wall first side, with the barrier cavity comprising a barrier cavity open end comprising a barrier cavity open end inner perimeter. The aircraft window barrier further comprises a barrier cavity cover, with the barrier cavity cover comprising a barrier cavity thickness extending from a barrier cavity cover first side to a barrier cover second side, with the barrier cavity cover further comprising at least one barrier cavity cover one-way through opening extending through the barrier cover thickness, with the barrier cavity cover comprising a barrier cavity cover outer perimeter dimensioned to closely match the match the barrier cavity open end inner perimeter, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmittance barrier base panel comprises a light transmittance value ranging from about 50% to about 75%.

In another present aspect, in the aircraft comprising the aircraft window barrier, the aircraft window barrier further comprises a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity.

Another present aspect is directed to an aircraft window assembly for inhibiting entry of debris into an aircraft multi-pane window of an aircraft, with the aircraft window assembly comprising an aircraft cabin sidewall recess comprising an aircraft cabin sidewall recess outer perimeter, with the aircraft cabin sidewall recess bounding an aircraft multi-pane window, with the aircraft multi-pane window comprising an inner windowpane, and with the inner window pane comprising a plurality of inner windowpane through openings. The aircraft window assembly further comprises an aircraft window barrier comprising a barrier base, with the barrier base comprising a barrier base first side (referred to equivalently herein as a barrier base inner side), and a barrier base second side (referred to equivalently herein as a barrier base outer/exterior side, a barrier base cutout section extending from a portion of the barrier base first side to a portion of the barrier base second side, a highly light-transmissive barrier base panel dimensioned to occupy the barrier base cutout section, and with the barrier base further comprising a barrier base outer perimeter. The aircraft window barrier further comprises a barrier continuous sidewall, with the barrier continuous sidewall extending substantially vertically from the barrier base first side of the barrier base, with the barrier continuous sidewall comprising a barrier continuous sidewall first side (referred to equivalently herein as a barrier continuous sidewall inner side), and a barrier continuous sidewall second side (referred to equivalently herein as a barrier continuous sidewall outer/exterior side), with the barrier continuous sidewall second side comprising a barrier continuous sidewall second side perimeter. The aircraft window barrier further comprises a barrier second wall extending from the barrier base first side, said barrier wall comprising barrier second wall thickness (T1) extending from a barrier second wall first side to a barrier second wall second side, with the barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side. The aircraft window barrier further comprises a barrier cavity, with the barrier cavity bounded by a portion of the barrier base first side, a portion of the barrier continuous sidewall first side, the highly-light transmissive barrier base panel, and the barrier second wall first side, with the barrier cavity comprising a barrier cavity open end comprising a barrier cavity open end inner perimeter. The aircraft window barrier further comprises a barrier cavity cover, with the barrier cavity cover comprising a barrier cavity thickness extending from a barrier cavity cover first side to a barrier cover second side, with the barrier cavity cover further comprising at least one barrier cavity cover one-way through opening extending through the barrier cover thickness, with the barrier cavity cover comprising a barrier cavity cover outer perimeter dimensioned to closely match the match the barrier cavity open end inner perimeter, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%.

In another present aspect, the aircraft window assembly further comprises, a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity.

Another present aspect is directed to an aircraft comprising an aircraft window assembly for inhibiting entry of debris into an aircraft multi-pane window of an aircraft, with the aircraft window assembly comprising an aircraft cabin sidewall recess comprising an aircraft cabin sidewall recess outer perimeter, with the aircraft cabin sidewall recess bounding an aircraft multi-pane window, with the aircraft multi-pane window comprising an inner windowpane, and with the inner window pane comprising a plurality of inner windowpane through openings. The aircraft window assembly further comprises an aircraft window barrier comprising a barrier base, with the barrier base comprising a barrier base first side (referred to equivalently herein as a barrier base inner side), and a barrier base second side (referred to equivalently herein as a barrier base outer/exterior side, a barrier base cutout section extending from a portion of the barrier base first side to a portion of the barrier base second side, a highly light-transmissive barrier base panel dimensioned to occupy the barrier base cutout section, and with the barrier base further comprising a barrier base outer perimeter. The aircraft window barrier further comprises a barrier continuous sidewall, with the barrier continuous sidewall extending substantially vertically from the barrier base first side of the barrier base, with the barrier continuous sidewall comprising a barrier continuous sidewall first side (referred to equivalently herein as a barrier continuous sidewall inner side), and a barrier continuous sidewall second side (referred to equivalently herein as a barrier continuous sidewall outer/exterior side), with the barrier continuous sidewall second side comprising a barrier continuous sidewall second side perimeter. The aircraft window barrier further comprises a barrier second wall extending from the barrier base first side, said barrier wall comprising barrier second wall thickness (T1) extending from a barrier second wall first side to a barrier second wall second side, with the barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side. The aircraft window barrier further comprises a barrier cavity, with the barrier cavity bounded by a portion of the barrier base first side, a portion of the barrier continuous sidewall first side, the highly-light transmissive barrier base panel, and the barrier second wall first side, with the barrier cavity comprising a barrier cavity open end comprising a barrier cavity open end inner perimeter. The aircraft window barrier further comprises a barrier cavity cover, with the barrier cavity cover comprising a barrier cavity thickness extending from a barrier cavity cover first side to a barrier cover second side, with the barrier cavity cover further comprising at least one barrier cavity cover one-way through opening extending through the barrier cover thickness, with the barrier cavity cover comprising a barrier cavity cover outer perimeter dimensioned to closely match the match the barrier cavity open end inner perimeter, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmittance barrier base panel comprises a light transmittance value ranging from about 50% to about 75%.

Another present aspect is directed to an aircraft comprising the aircraft window assembly further comprising a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity.

Another present aspect is directed to a method for impeding entry of unwanted debris into an aircraft multi-pane window during aircraft construction and aircraft storage, with the method comprising installing an aircraft window barrier into an aircraft window cabin sidewall window recess and adjacent to an inner windowpane of an aircraft muti-pane window, with the aircraft window barrier comprising with the barrier base comprising a barrier base first side (referred to equivalently herein as a barrier base inner side), and a barrier base second side (referred to equivalently herein as a barrier base outer/exterior side, a barrier base cutout section extending from a portion of the barrier base first side to a portion of the barrier base second side, a highly light-transmissive barrier base panel dimensioned to occupy the barrier base cutout section, and with the barrier base further comprising a barrier base outer perimeter. The aircraft window barrier further comprises a barrier continuous sidewall, with the barrier continuous sidewall extending substantially vertically from the barrier base first side of the barrier base, with the barrier continuous sidewall comprising a barrier continuous sidewall first side (referred to equivalently herein as a barrier continuous sidewall inner side), and a barrier continuous sidewall second side (referred to equivalently herein as a barrier continuous sidewall outer/exterior side), with the barrier continuous sidewall second side comprising a barrier continuous sidewall second side perimeter. The aircraft window barrier further comprises a barrier second wall extending from the barrier base first side, said barrier wall comprising barrier second wall thickness (T1) extending from a barrier second wall first side to a barrier second wall second side, with the barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side. The aircraft window barrier further comprises a barrier cavity, with the barrier cavity bounded by a portion of the barrier base first side, a portion of the barrier continuous sidewall first side, the highly-light transmissive barrier base panel, and the barrier second wall first side, with the barrier cavity comprising a barrier cavity open end, said barrier cavity open end comprising a barrier cavity open end inner perimeter. The aircraft window barrier further comprises a barrier cavity cover, with the barrier cavity cover comprising a barrier cavity thickness extending from a barrier cavity cover first side to a barrier cover second side, with the barrier cavity cover further comprising at least one barrier cavity cover one-way through opening extending through the barrier cover thickness, with the barrier cavity cover comprising a barrier cavity cover outer perimeter dimensioned to closely match the match the barrier cavity open end inner perimeter, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%.

In another present aspect, the method further includes installing an aircraft window barrier into an aircraft window cabin sidewall window recess and adjacent to an inner windowpane of an aircraft muti-pane window, with the aircraft window barrier further comprising a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity.

In another present aspect a method further comprises establishing a light transmittance gradient in the barrier base, the barrier base comprising a light transmittance value ranging from about 0% to about 25%, the barrier continuous sidewall comprising a light transmittance value ranging from about 0% to about 25%, the barrier cavity cover comprising a light transmittance value ranging from about 25% to about 75%, and the highly light-transmittance barrier base panel comprising a light transmittance value ranging from about 50% to about 75%.

In another present aspect, the method further comprises attracting unwanted debris from an aircraft cabin into the barrier cavity.

In another present aspect, the method further comprises retaining in the barrier cavity unwanted debris attracted into the barrier.

In another present aspect, the method further comprises installing the aircraft window barrier with the aircraft window barrier further comprising a removable cartridge, with the removable cartridge dimensioned to be housed in an intimate fit within the barrier cavity, with the removable cartridge comprising a cartridge base, with the cartridge base comprising a cartridge base perimeter, a plurality of adjoining cartridge walls extending from the cartridge base perimeter of the cartridge base, with the plurality of adjoining walls fixedly attached to the barrier cavity cover), to form a cartridge cover, and with the cartridge cover comprising a cartridge cover perimeter, with the cartridge cover perimeter configured to align with the cartridge base perimeter, and with the plurality of cartridge walls sandwiched between the cartridge base and the cartridge cover to form the removable cartridge, with the cartridge cover comprising a cartridge cover thickness extending from a cartridge cover first side to a cartridge cover second side, with the cartridge cover comprising at least one cartridge cover one-way through opening extending through the cartridge cover thickness, with the removable cartridge further comprising a removable cartridge footprint, with the removable cartridge further comprising a removable cartridge internal chamber, with the removable cartridge internal chamber defined by the cartridge base, the cartridge walls, and the cartridge cover, and with the removable cartridge footprint dimensioned to be received by the barrier cavity, and the method further comprises retaining in the barrier cavity unwanted debris attracted into a removable cartridge, with the removable cartridge configured to substantially occupy the barrier cavity.

In another present aspect, the removable cartridge footprint is dimensioned to be completely housed within the barrier cavity.

In another present aspect, the removable cartridge is transparent.

In a further present aspect, the aircraft window barrier further comprises a barrier handle, with the barrier handle in direct communication with the barrier continuous sidewall.

In another present aspect, the barrier handle is integral with the barrier continuous sidewall.

In another present aspect, the barrier continuous sidewall seal comprises a compressible foam material.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1A:
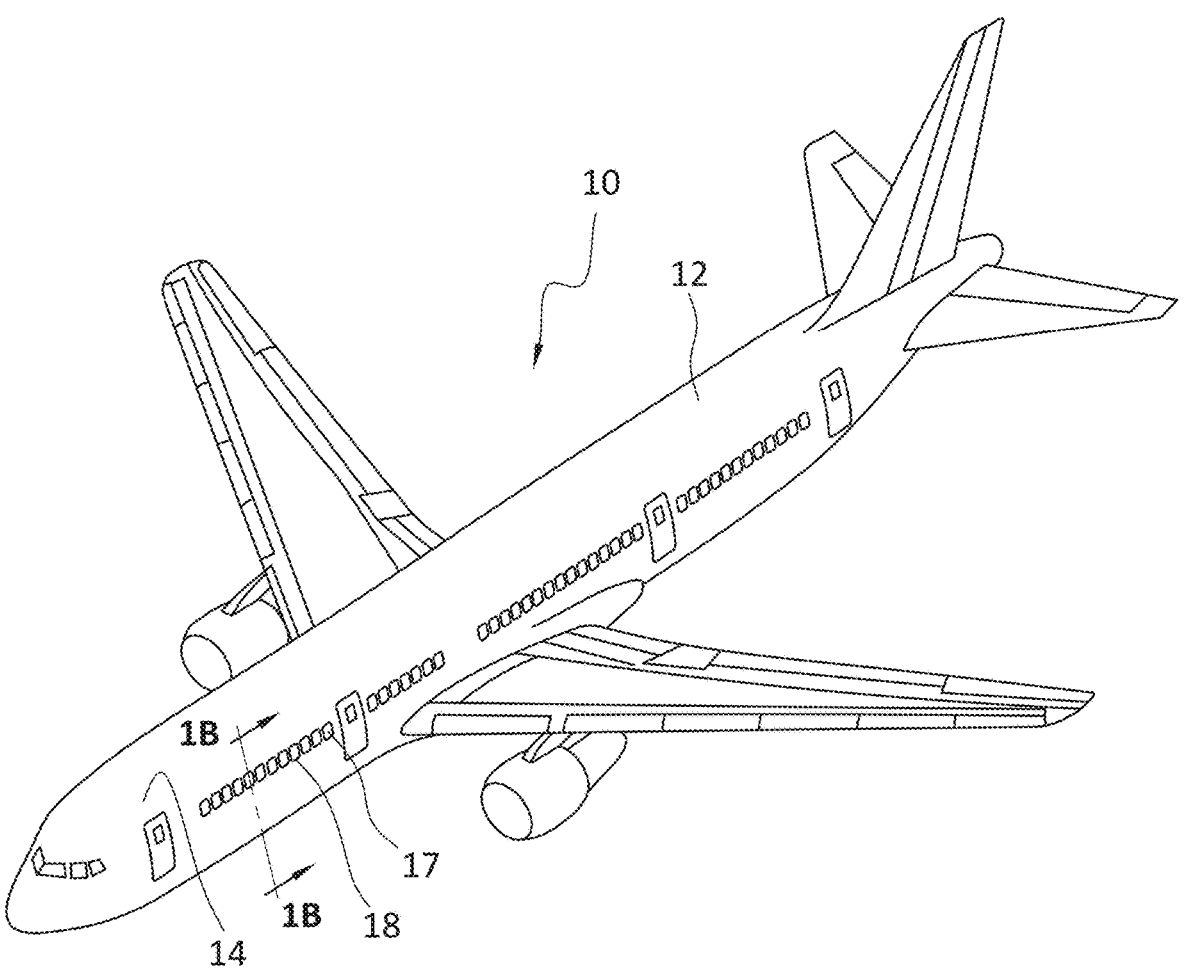
Figure 1B:
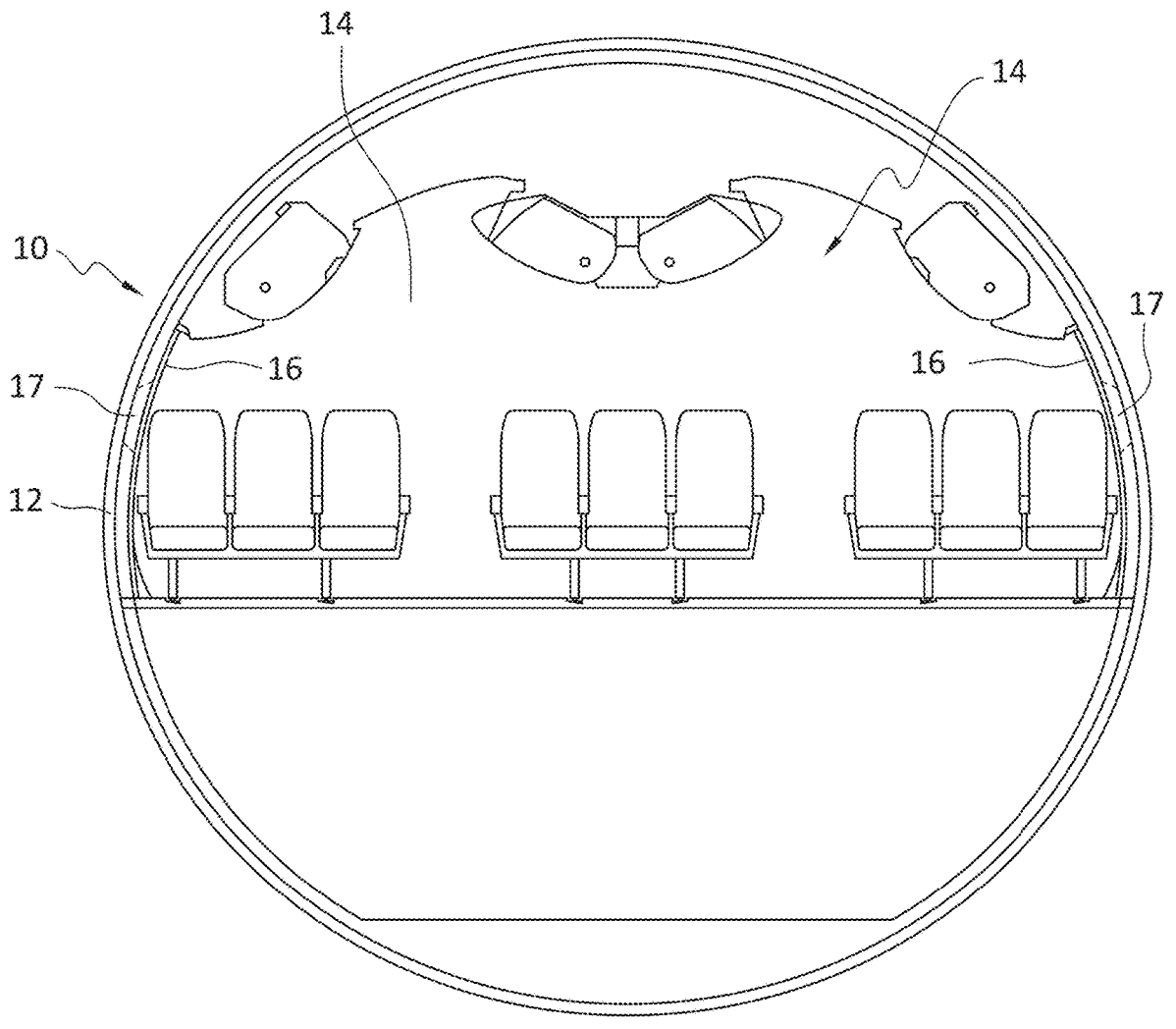
Figure 2:
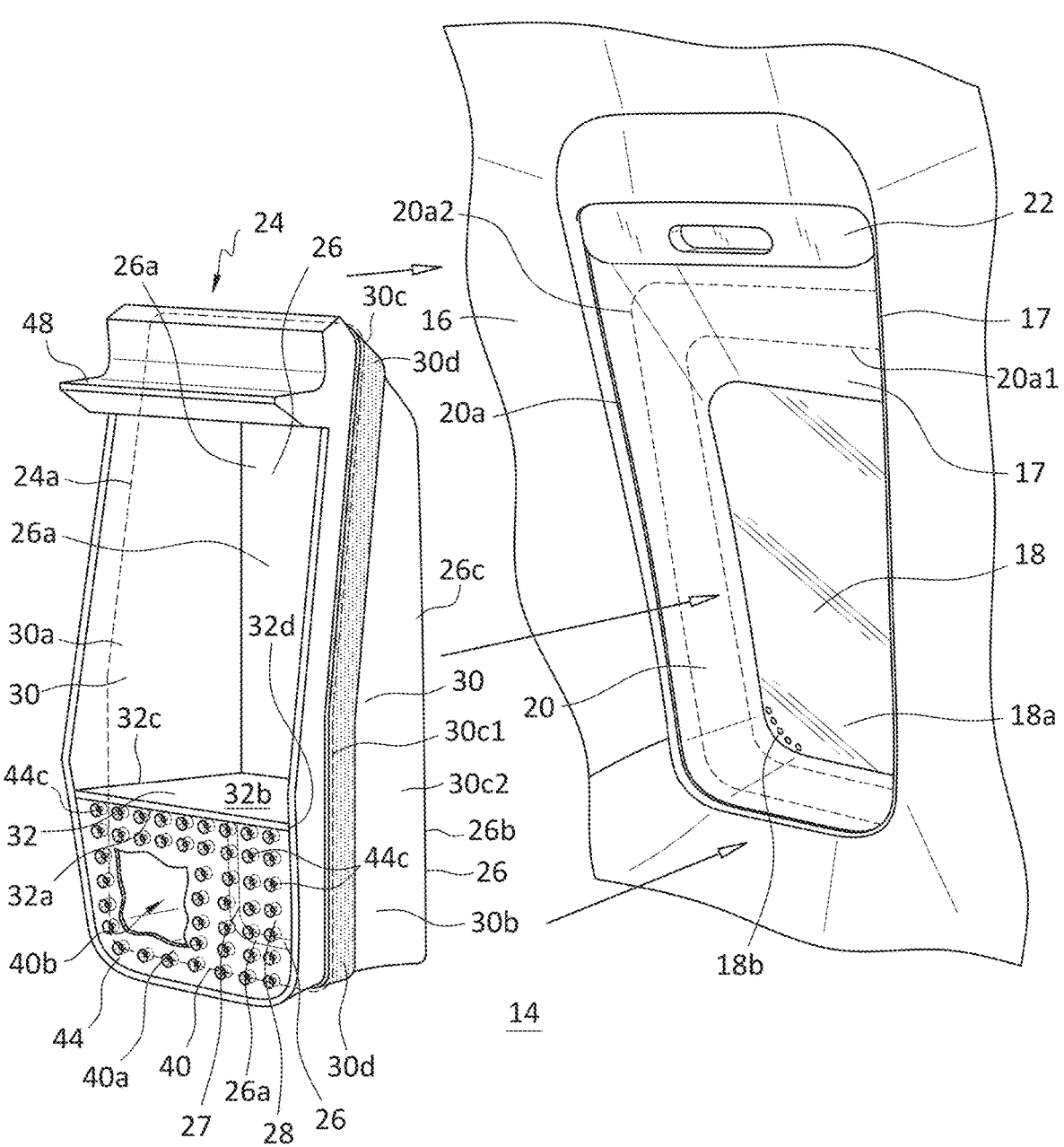
Figure 3A:
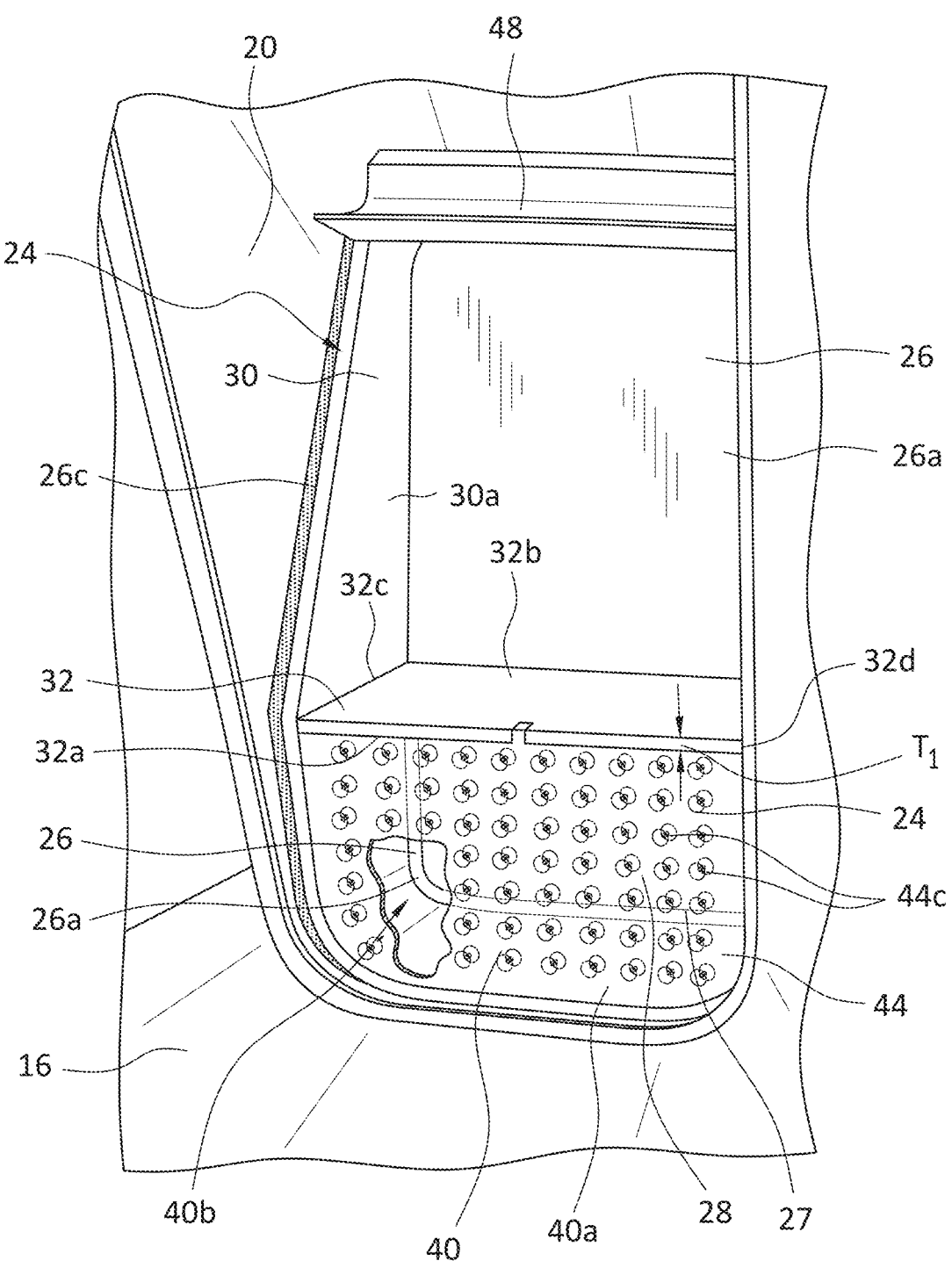
Figure 3B:
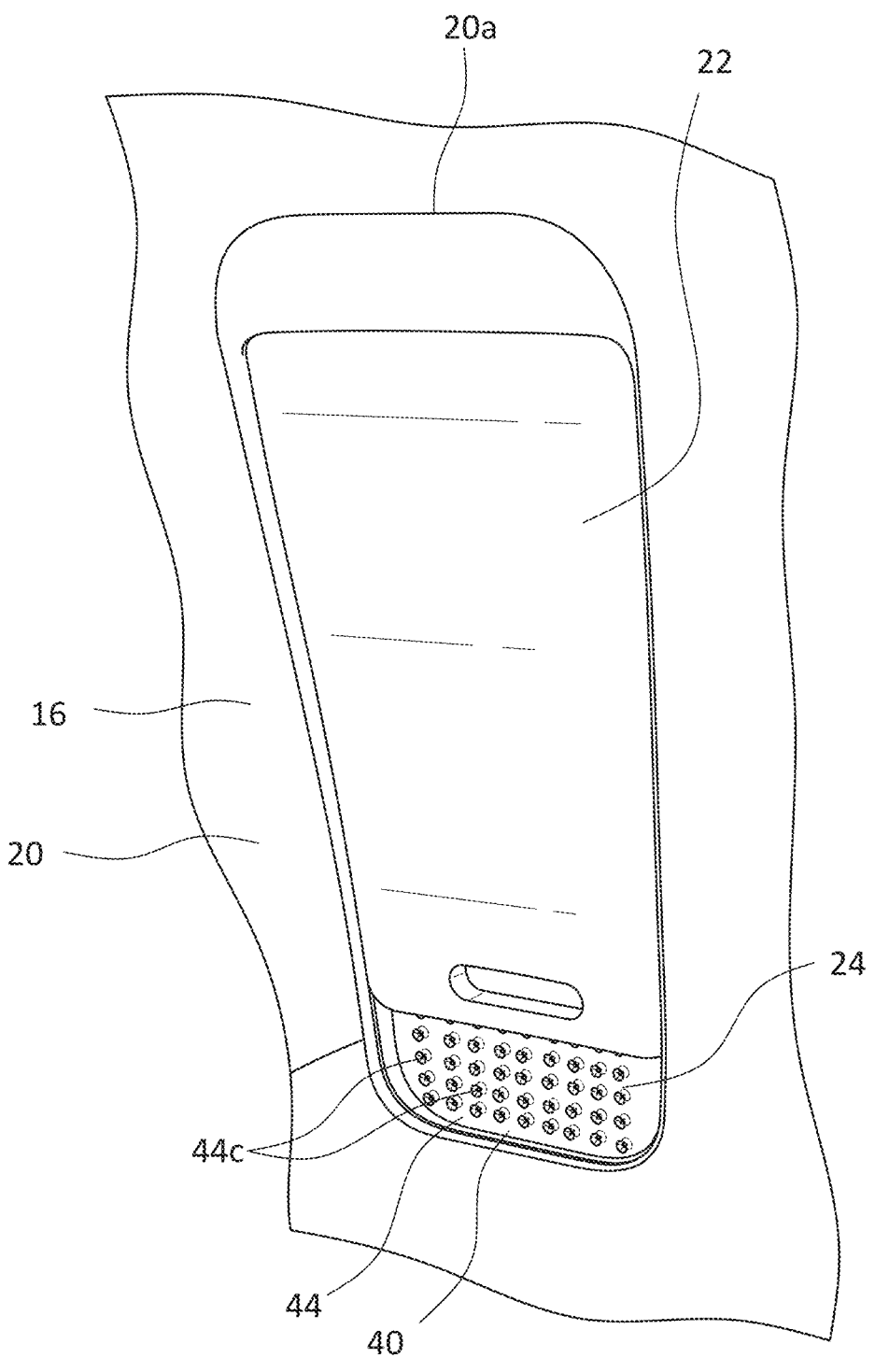
Figure 4A:
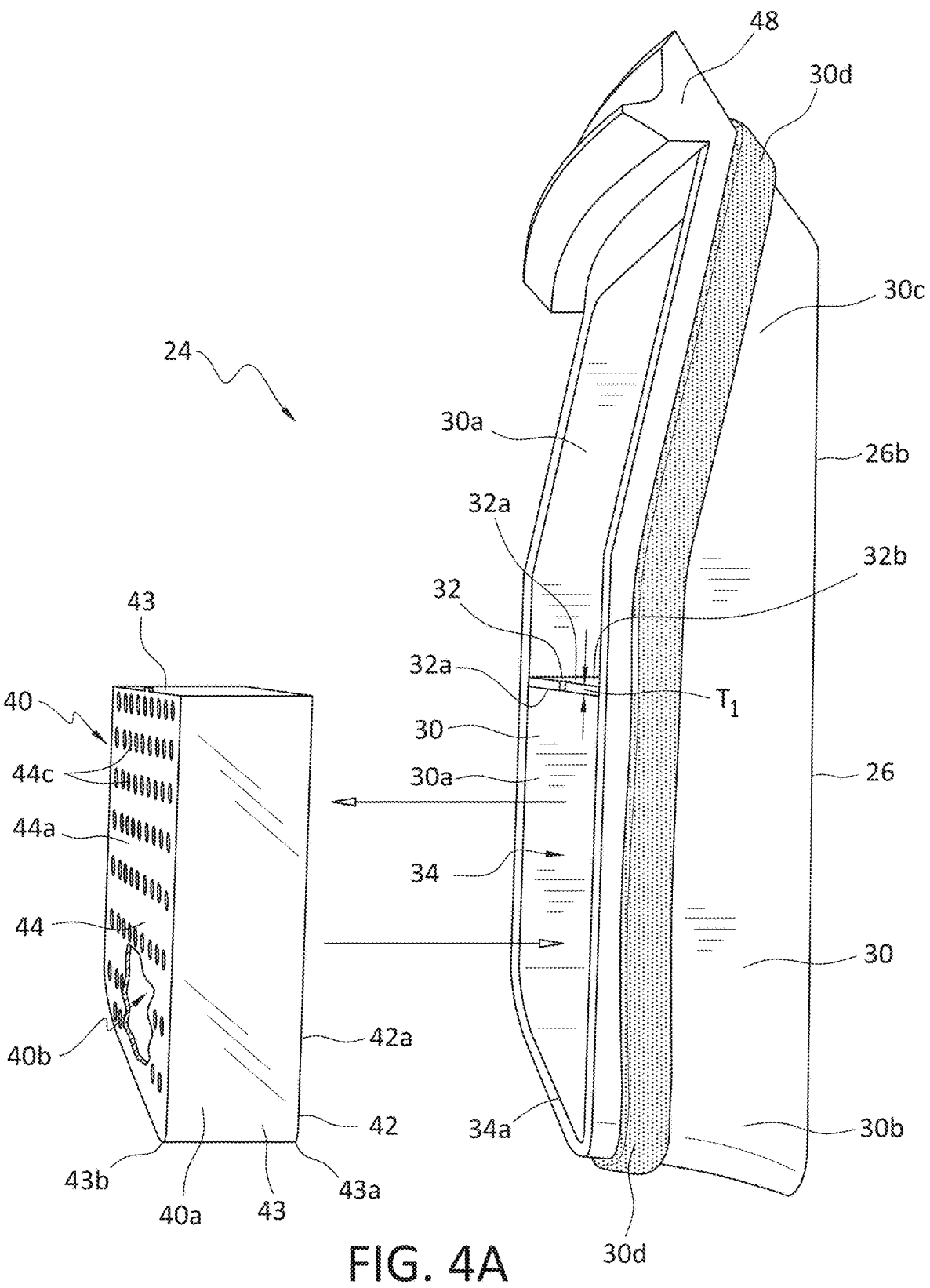
Figure 4B:
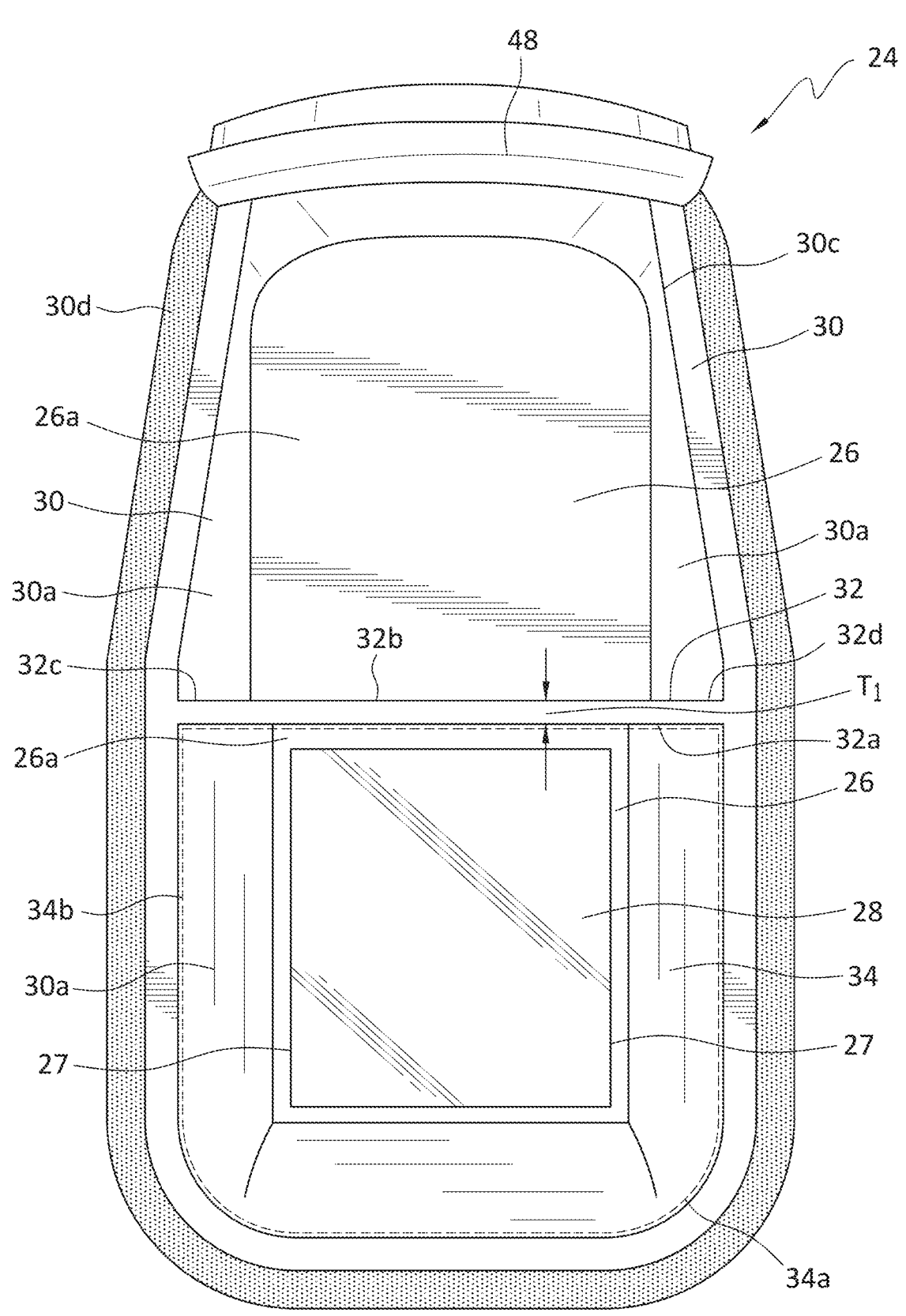
Figure 4C:
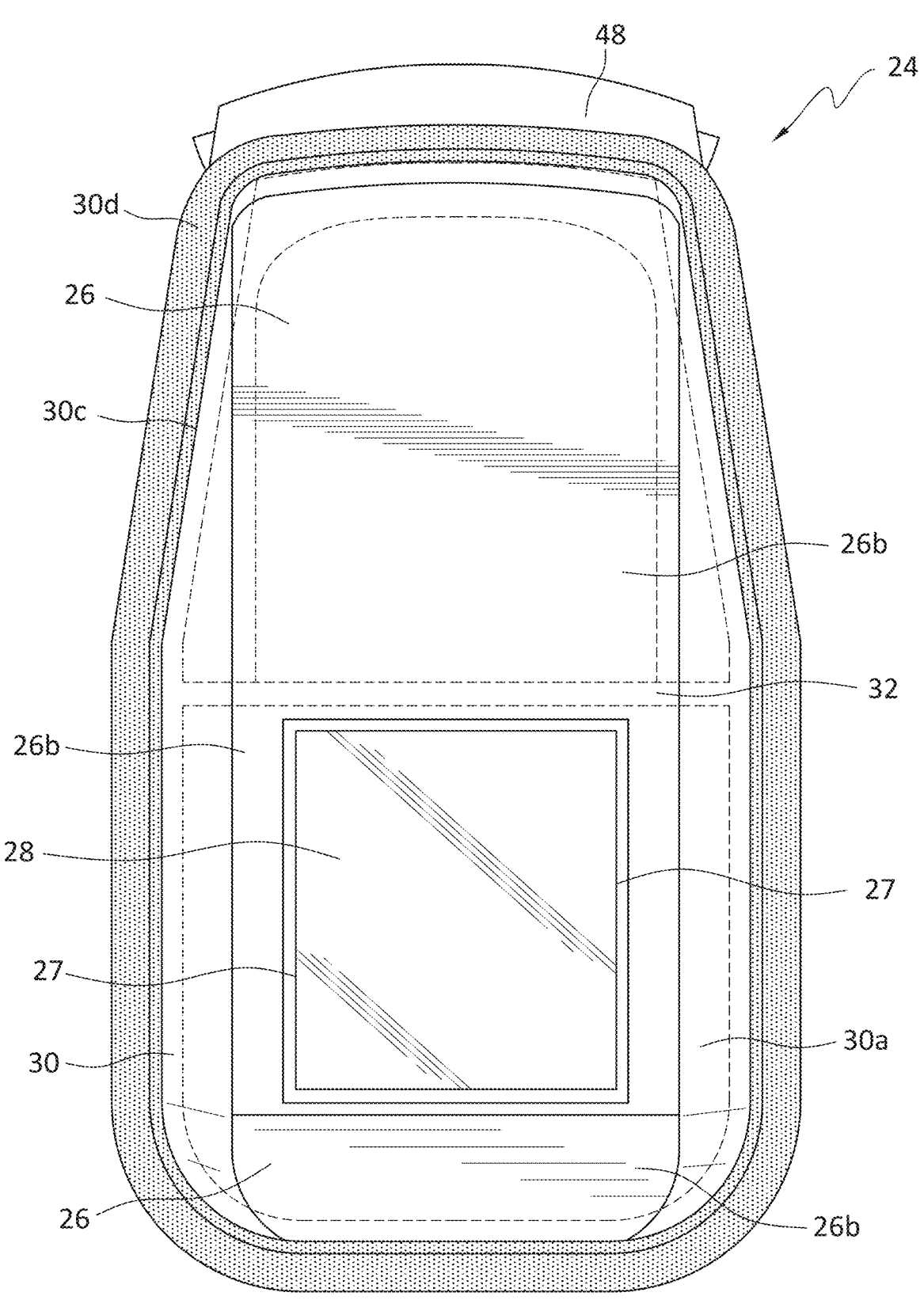
Figures 5, 6:
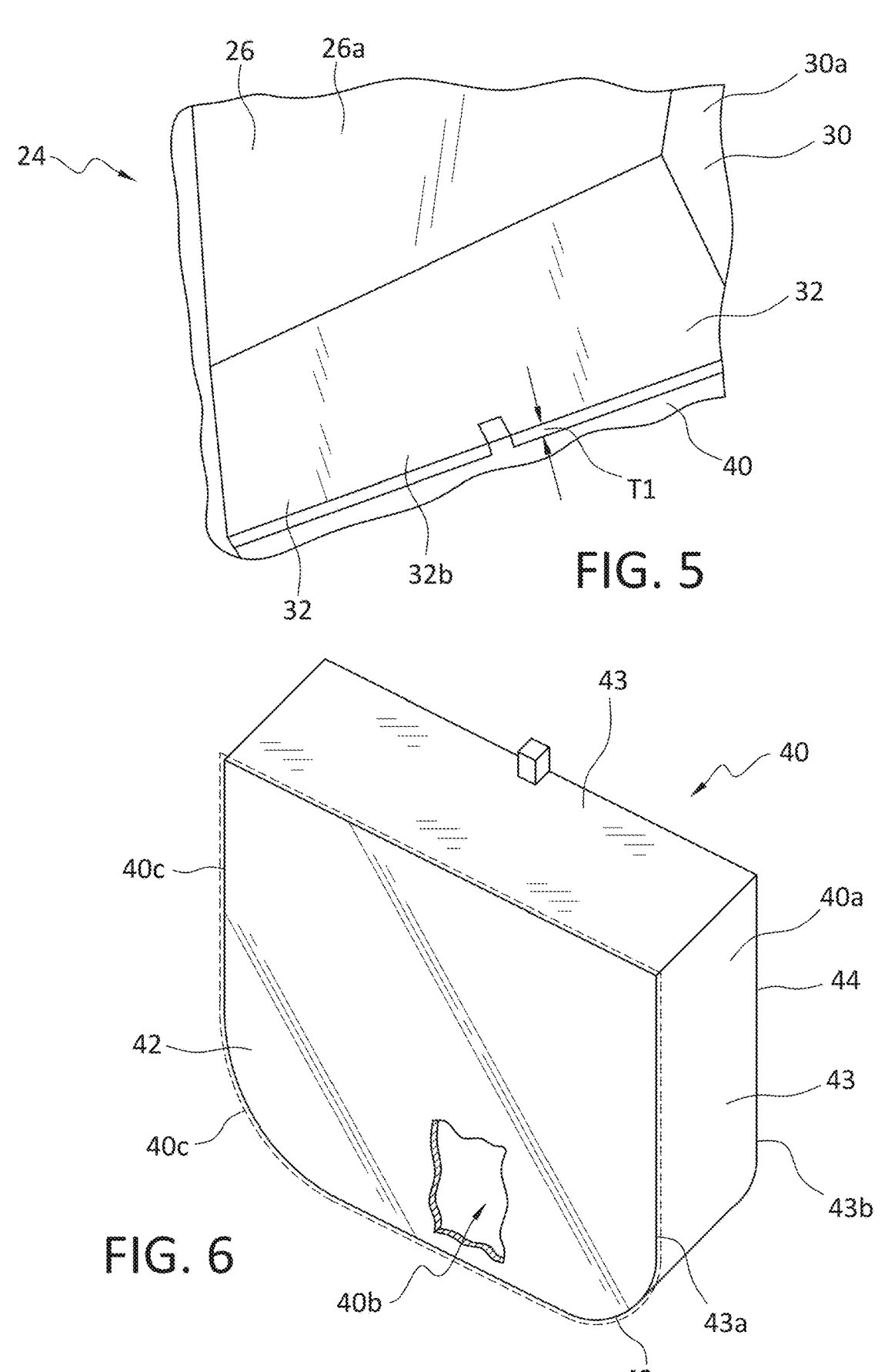
Figure 7:
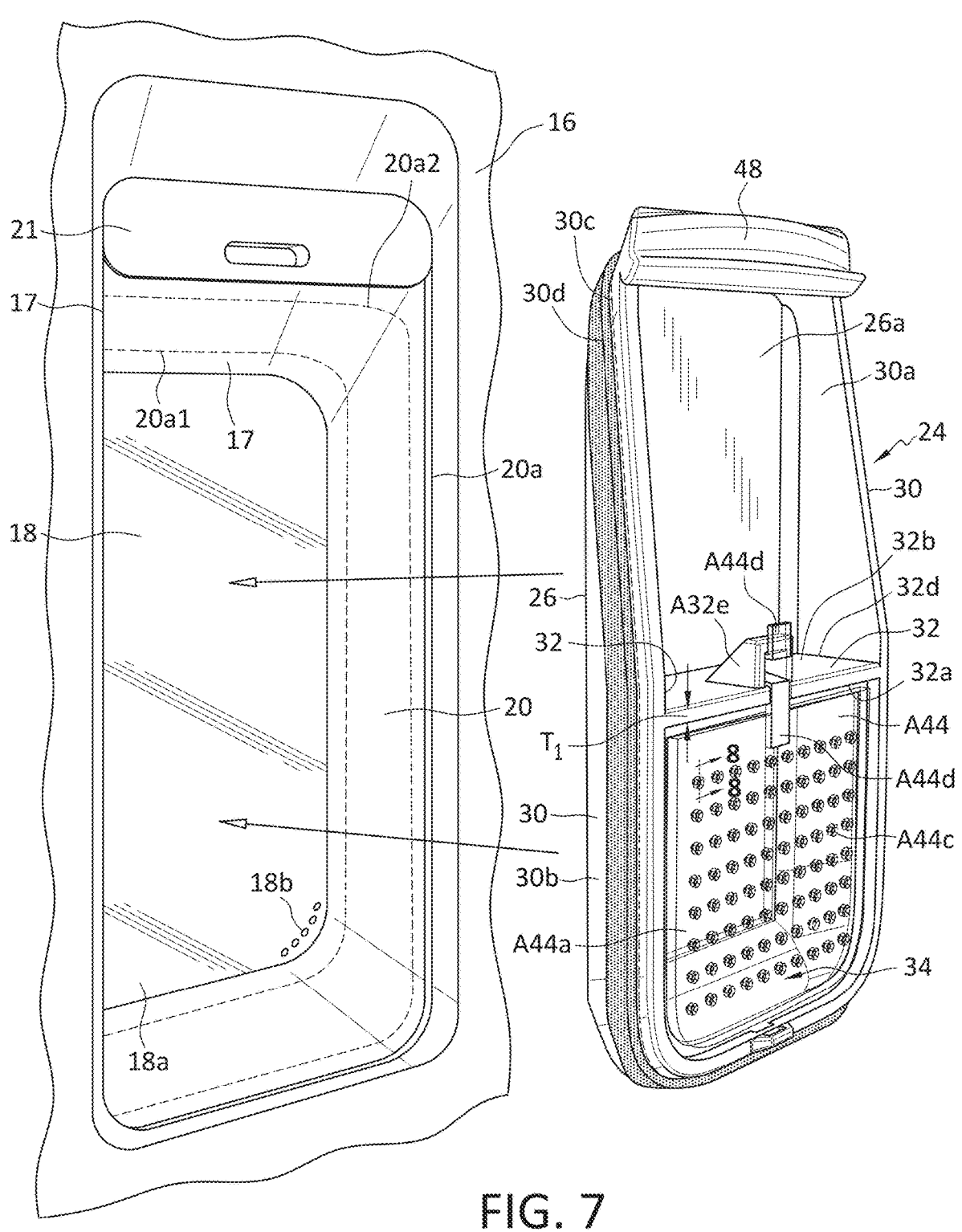
Figures 8, 9:
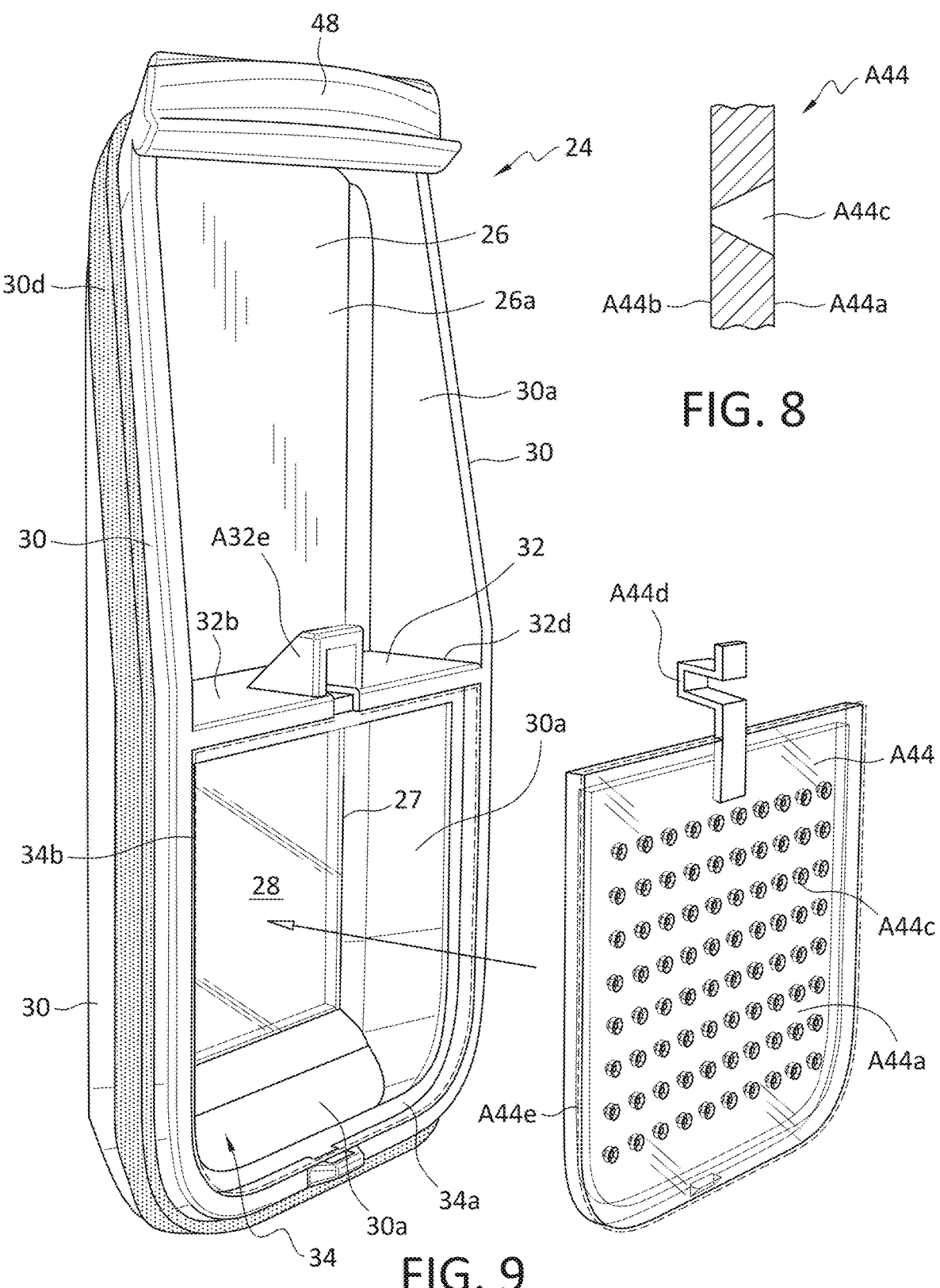
Figure 10:
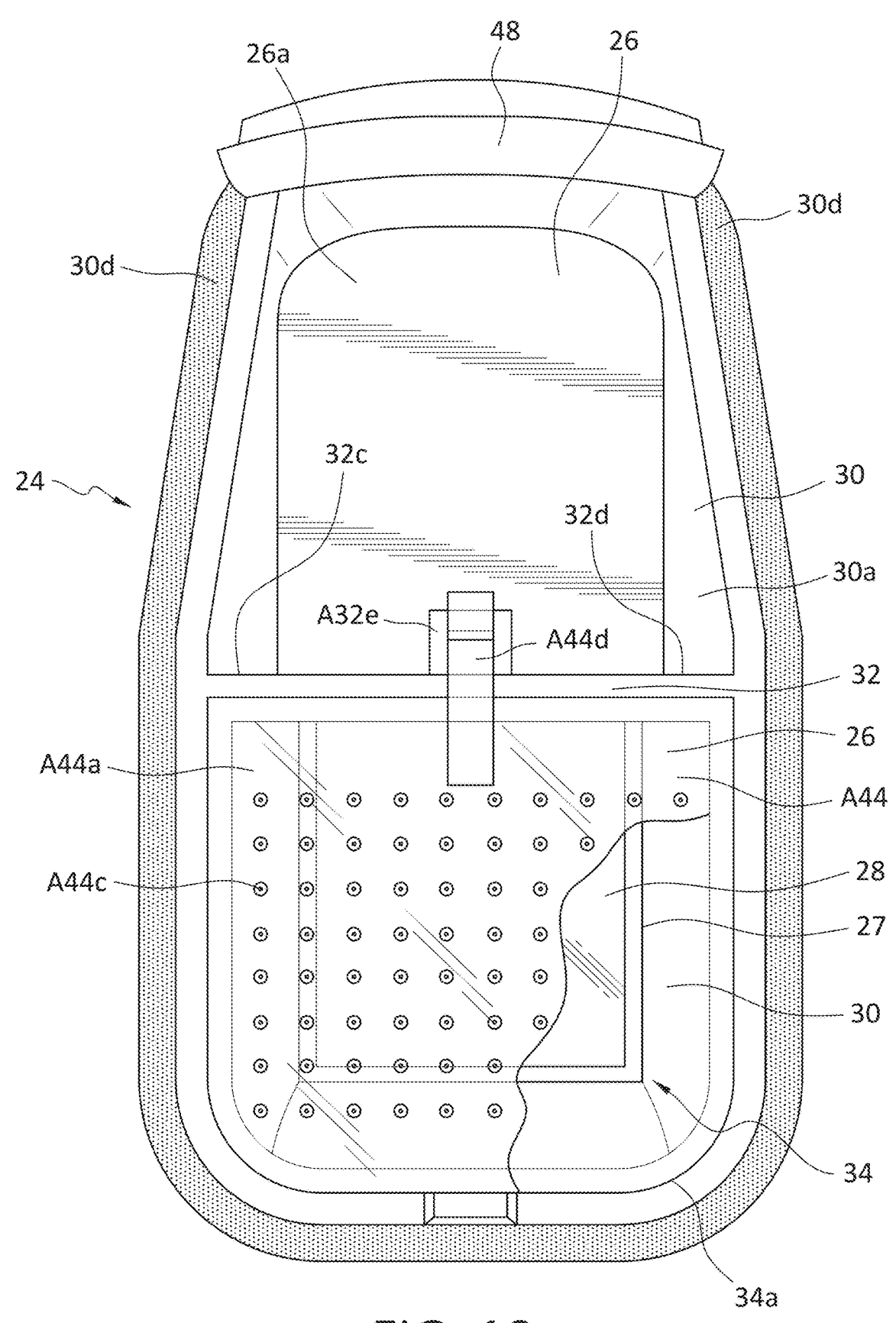
Figure 11:
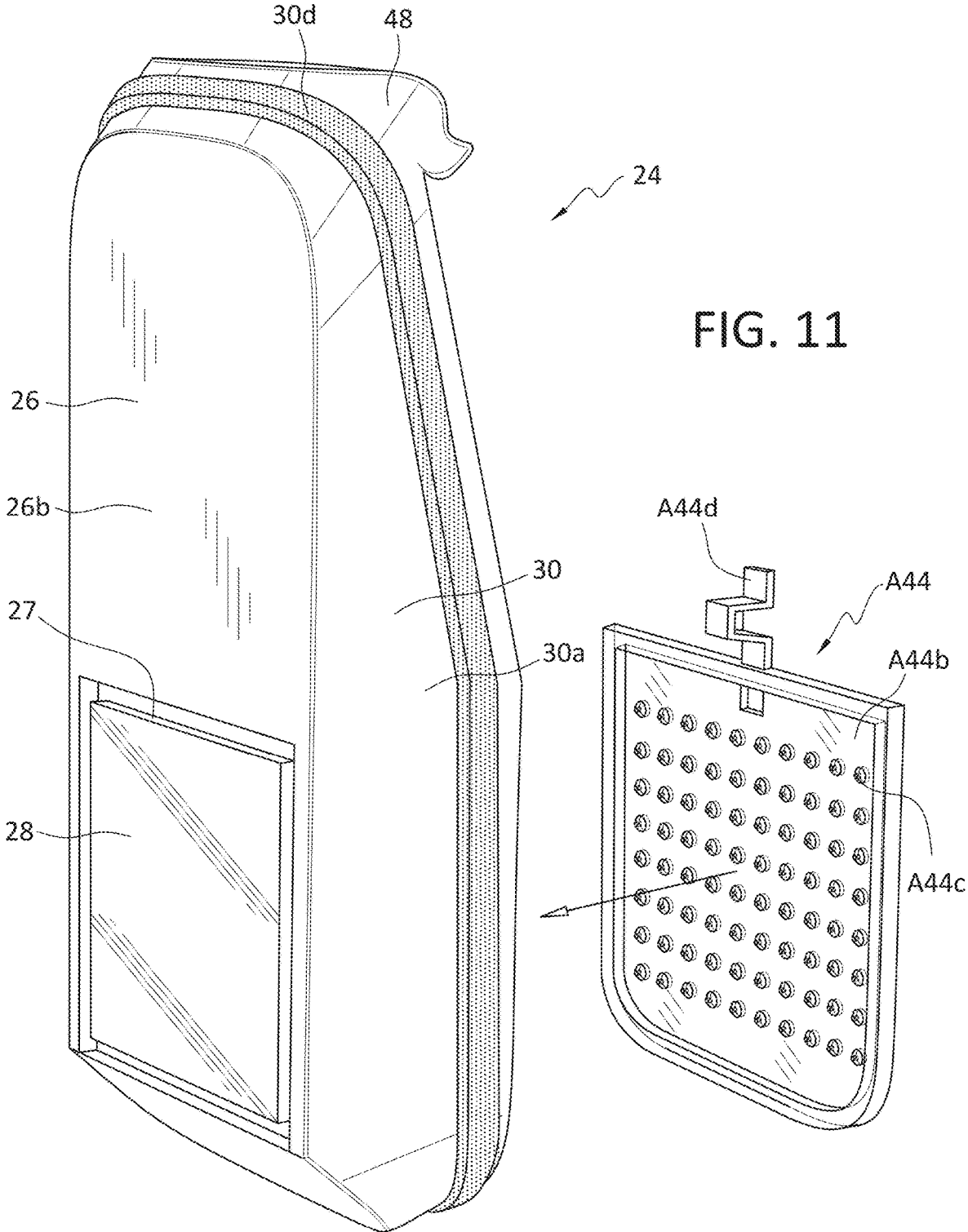
Figure 12:
Figure 13:
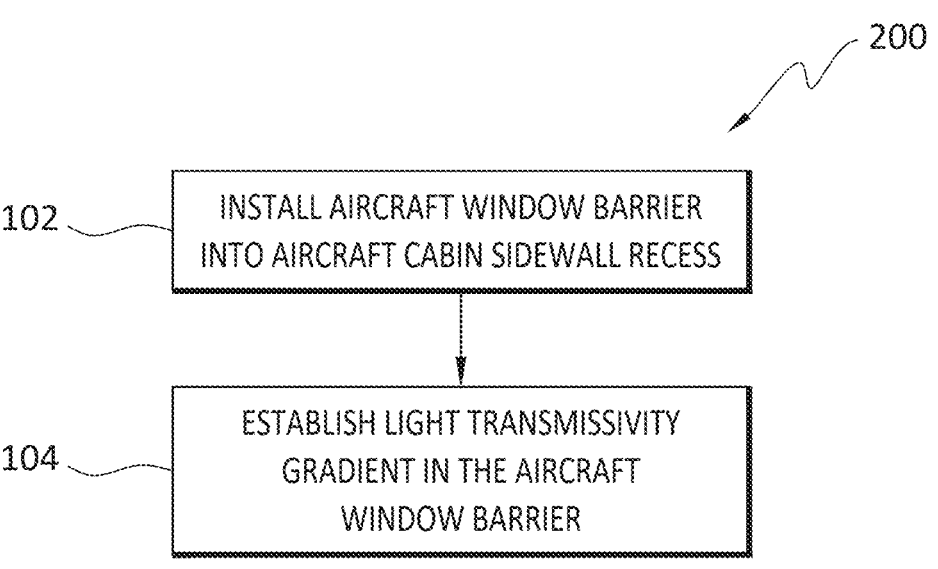
Figure 14:
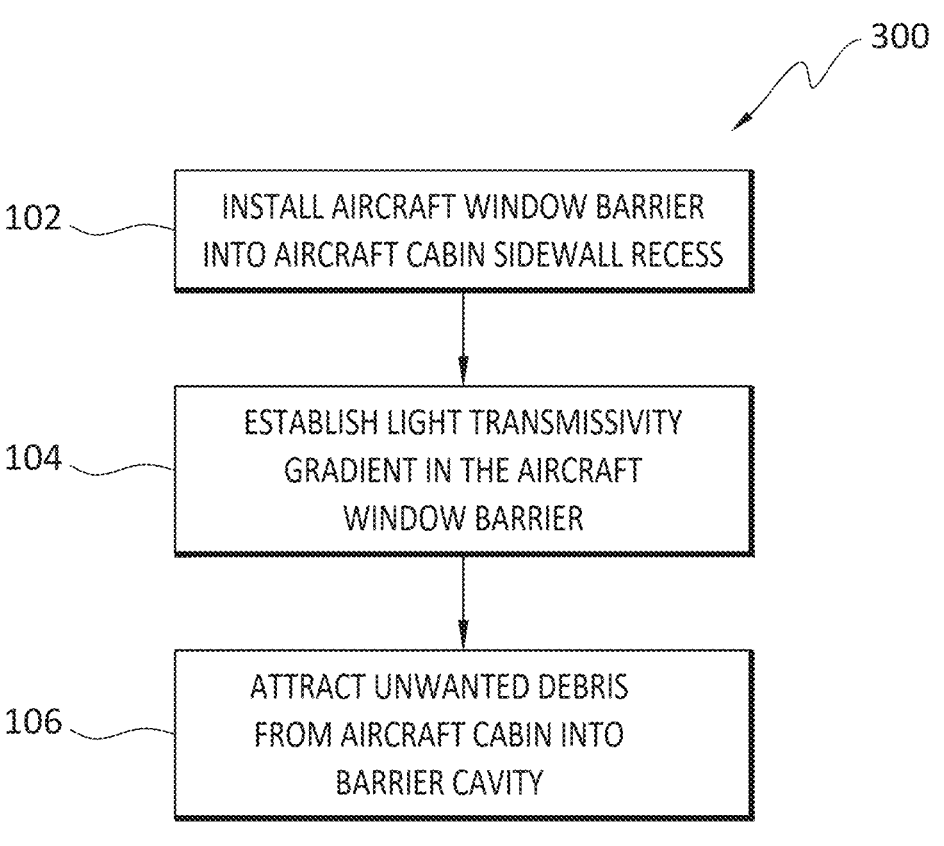
Figure 15:
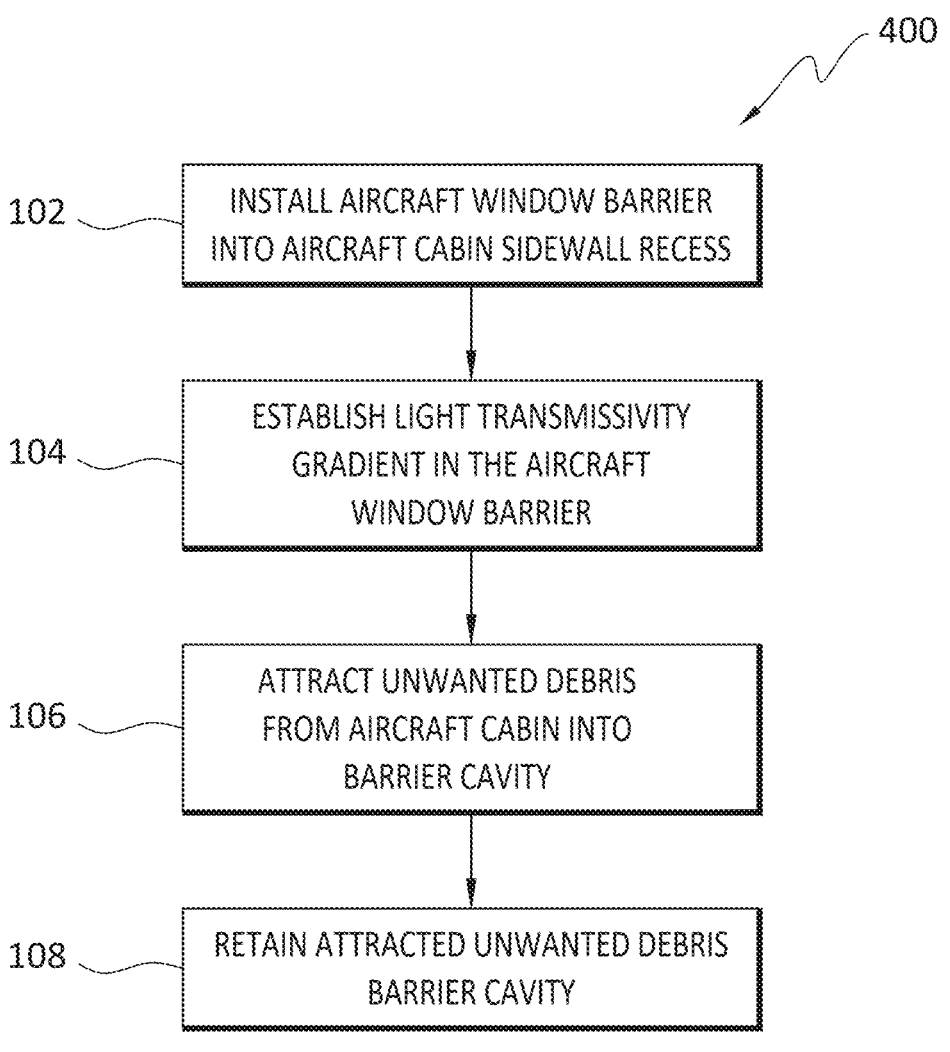
Figure 16:
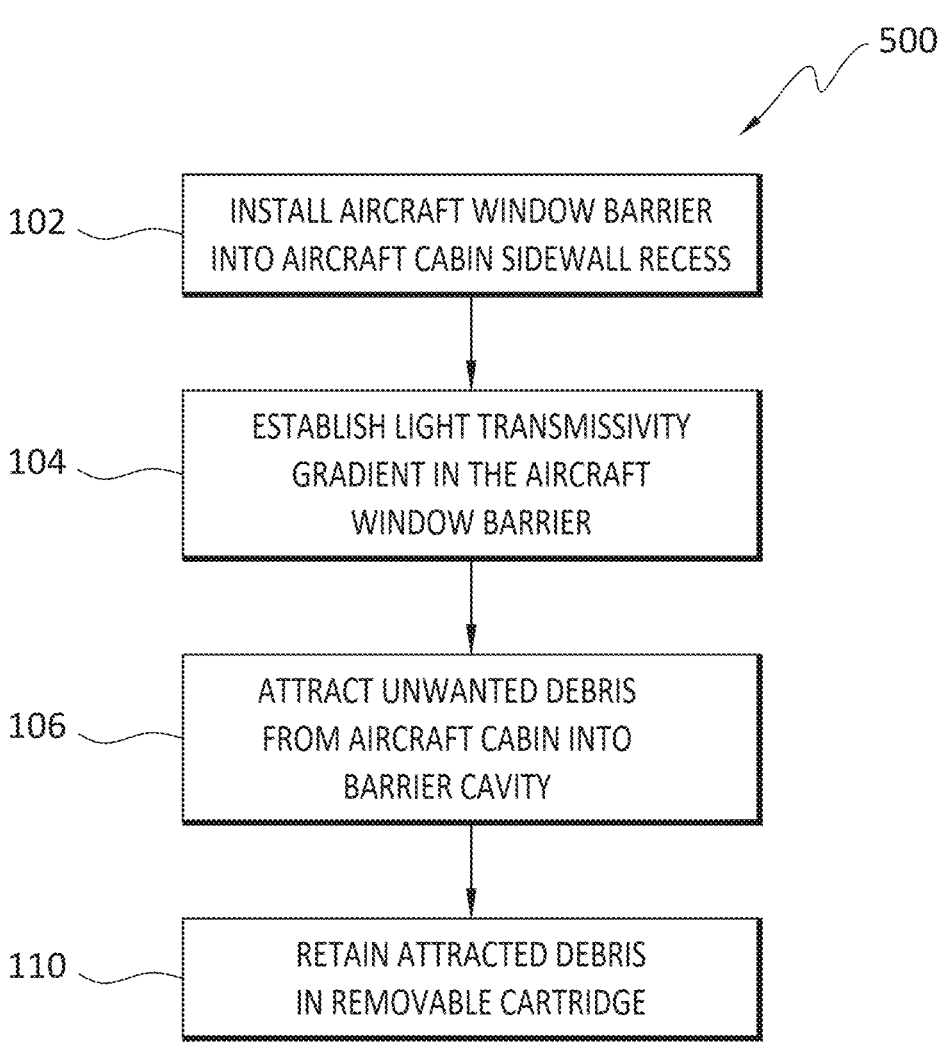

Having thus described variations of the disclosure in general terms, reference will now be made to the accompanying drawings, which are not necessarily drawn to scale, and wherein:

FIG. 1A is an illustration of an aircraft, according to present aspects;

FIG. 1B is an illustration of an aircraft cabin within an aircraft of the type shown in FIG. 1B, according to present aspects;

FIG. 2 is an enlarged partial view of a present aircraft multi-pane window assembly located at an aircraft cabin sidewall of an aircraft of the type shown in FIGS. 1A and 1B;

FIG. 3A is an enlarged partial view of a present aircraft multi-pane window assembly housing the present aircraft window barrier, according to present aspects;

FIG. 3B is an enlarged partial view of a present aircraft multi-pane window assembly housing the present aircraft window barrier with a window cover partially deployed, according to present aspects;

FIG. 4A is a perspective side view of the present aircraft window barrier, according to present aspects;

FIG. 4B is a front view of the present aircraft window barrier, according to present aspects;

FIG. 4C is a back view of the present aircraft window barrier, according to present aspects;

FIG. 5 is a an enlarged view of a present aircraft window barrier showing the barrier second wall, according to present aspects;

FIG. 6 is a perspective back view of the removable cartridge of the type contained within the present aircraft window barrier, according to present aspects;

FIG. 7 is an enlarged partial view of a present aircraft multi-pane window assembly located at an aircraft cabin sidewall of an aircraft of the type shown in FIGS. 1A and 1B;

FIG. 8 is an enlarged cross-sectional side view of the barrier cover with through openings, according to present aspects;

FIG. 9 is an enlarged partially exploded view of the present aircraft window barrier, according to present aspects;

FIG. 10 is a front view of the present aircraft window barrier, according to present aspects;

FIG. 11 is a perspective back view of the present aircraft window barrier, according to present aspects;

FIG. 12 is a flowchart outlining a present method, according to present aspects;

FIG. 13 is a flowchart outlining a present method, according to present aspects;

FIG. 14 is a flowchart outlining a present method, according to present aspects;

FIG. 15 is a flowchart outlining a present method, according to present aspects; and FIG. 16 is a flowchart outlining a present method, according to present aspects.

DETAILED DESCRIPTION

Present aspects are directed to an aircraft window barrier for an aircraft cabin interior, with the aircraft window barrier, when installed into an aircraft cabin sidewall window recess and positioned adjacent to an aircraft window assembly, configured to act at least as a both: 1) as a barrier to impede the progression and admission of debris from within an aircraft cabin into a multi-pane aircraft window (e.g., debris to include foreign object debris, dust, dirt, insect infiltration debris, etc.) and 2) actively attract, trap, collect, and retain insects into the window barrier. Further present aspects are directed to an aircraft window assembly and an aircraft cabin assembly that comprises the present aircraft interior window barrier. Further present aspects are directed to aircraft comprising the present aircraft window assembly and/or a present aircraft cabin assembly, and methods for impeding the entry of debris into an aircraft multi-pane window assembly from the cabin side of aircraft window assembly that comprises the installation of the present aircraft window barrier into an aircraft cabin window assembly.

The present aircraft interior window barrier is configured for use during aircraft production, aircraft construction, aircraft storage, aircraft delivery, and/or during aircraft non-flight phases.

The accompanying FIGS. are provided and described herein to further illustrate aspects of the present disclosure. FIG. 1A is a perspective view of an aircraft 10 comprising an aircraft fuselage 12, with the aircraft 10 being of the type that can comprise an aircraft cabin 14 substantially bounded by an aircraft cabin outboard wall (equivalently referred to herein as a "sidewall") positioned within the aircraft fuselage interior (e.g., shown in FIG. 2). FIG. 1 further shows the location of an aircraft window assembly 17 comprising an aircraft multi-pane window 18.

FIG. 1B is a representative cross-sectional view of aircraft 10 that can be of the type shown in FIG. 1A, taken along line 1B-1B with a view into aircraft cabin 14. As shown in FIG. 1B, aircraft cabin 14 (referred to equivalently herein as "aircraft passenger cabin") can comprise an aircraft cabin sidewall 16 (referred to equivalently herein, at least with respect to a position within the aircraft cabin, as an "aircraft cabin outboard wall"). Aircraft cabin 14 comprises a plurality of aircraft window assemblies 17 located along the length of the aircraft and that provide viewing areas and out of the aircraft cabin 14 of the aircraft 10.

FIG. 2 is an enlarged partial view of an aircraft cabin sidewall 16 as viewed from within aircraft cabin 14 of aircraft 10. As shown in FIG. 2, aircraft cabin window assembly 17 comprises an aircraft window assembly profile comprising aircraft window frame 17a configured to secure and otherwise securely position aircraft multi-pane window 18 within the aircraft window assembly 17. Aircraft multi-pane window 18 further comprises inner windowpane 18a. Inner windowpane 18a comprises an inner windowpane thickness and further comprises a plurality of inner windowpane through openings 18*b* that can be configured to assist in the operational performance of the multi-pane window 18 and that further can assist, for example, in reducing buildup of condensation within the aircraft multi-pane window 18.

The inner windowpane through openings 18*b* in the inner windowpane 18*a* can represent a point of entry of unwanted debris into the aircraft multi-pane window 18 from within the aircraft cabin interior. According to present aspects, the present aircraft window barrier 24 is dimensioned to completely occupy space within the aircraft cabin sidewall window recess 20. In one example of an installation, the aircraft window barrier is dimensioned rest adjacent to the inner windowpane 18*a*. According to present aspects, aircraft window barrier 24 has an aircraft window barrier outer perimeter 24*a* that closely matches the aircraft window recess inner perimeter 20*a*.

When the aircraft window barrier 24 is installed into and is otherwise received by the aircraft cabin sidewall window recess 20 (as indicated in FIG. 2 by the "arrows") a snug fit and a removable sealed fit will be achieved, with a removable seal achieved at the aircraft window recess inner perimeter 20*a*/aircraft window barrier outer perimeter 24*a* interface. In addition, in the aircraft window barrier installed position, the aircraft window barrier 24 can further completely block entry of debris from an aircraft interior into the aircraft multi-pane window 18 via the inner windowpane through openings 18*b*, as the back surface of the inserted (e.g., installed) aircraft window barrier 24 can rest immediately adjacent to the inner windowpane 18*a*.

As shown at least in FIG. 2, when aircraft window barrier 24 is located adjacent the inner windowpane 18*a* (and located adjacent the aircraft multi-pane window 18), aircraft window barrier 24 is configured and dimensioned to reside and otherwise occupy a space in the aircraft cabin sidewall window recess 20 such that the complete aircraft window barrier footprint will not impede or otherwise dimensionally interfere with the movement of a movable window cover 22 (referred to equivalently herein as a "movable window shade) from a stowed position shown in FIG. 2 to a fully deployed position (fully deployed movable window cover position shown in FIG. 3B.

Aircraft window barrier 24 comprises a barrier base 26 that is partially visible in FIG. 2 as a substantially vertical "back wall" that further comprises a barrier base first side 26*a* (facing "inboard", and/or facing into the aircraft cabin interior), and a barrier base second side 26*b* that is not visible in FIG. 2 and that, in an installed position adjacent the inner windowpane 18*a*, faces "outboard" and faces and can rest immediately adjacent to the inner windowpane 18*a*. Barrier base 26 further comprises barrier base outer perimeter 26*c* that can be configured to have a width and height that is less than the width and height of the aircraft window barrier outer perimeter 24*a* so that aircraft window batter 24 in the installed position can be dimensioned to nest against the aircraft window assembly frame 17*a* in the aircraft cabin sidewall window recess 20, even when the aircraft cabin sidewall window recess 20 is contoured, tapered, or otherwise changes recess width and height dimension along the recess depth; e.g., when the aircraft cabin sidewall window recess 20 comprises a changing perimeter value between the aircraft cabin sidewall window recess first inner perimeter 20*a1* ("outboard" recess inner perimeter) and aircraft cabin sidewall window recess second inner perimeter 20*a2* ("inboard" recess inner perimeter) and that can occur when the aircraft window assembly frame and/or recess is, for example, inwardly "tapered" or inwardly "angled" from an inboard to an outboard location or region of the aircraft window assembly 17.

As shown more visibly at least in FIGS. 4B and 4C, barrier base 26 further comprises a barrier base cutout section 27 at a section of the barrier base (referred to equivalently herein as a barrier base cutout region) extending through the thickness of barrier base 26 from barrier base first side 26*a* to barrier base second side 26*b*. A highly light transmissive barrier base panel 28 is configured to dimensionally occupy and otherwise "fill" the entirety of the area of the barrier base cutout section 27. The highly light-transmissive barrier base panel 28 can permanently adhere to the barrier base 26 about its perimeter. In one example, the barrier base can be additively manufactured to include one material that can be a translucent material for the majority of the barrier base, and the highly-light-transmissive barrier base panel 28 can include a different material that has a significantly higher light transmittance value that does the material used to construct the remainder of the barrier base. The presence in the barrier base of two regions having significantly differing light transmittance values create a light transmittance gradient in the barrier base.

Aircraft window barrier 24 further comprises barrier continuous sidewall 30 extending substantially vertically (close to 90 degrees from the plane of the substantially planar barrier base, and allowably varying from 90 degrees to achieve a taper and/or dimensional contour that can substantially complementarily match a dimensional taper found in the aircraft cabin sidewall window recess 20) from the barrier base first side 26*a* at or near the barrier base outer perimeter 26*c* of the barrier base 26, and with barrier continuous sidewall 30 comprising a barrier continuous sidewall first side 30*a* (referred to equivalently herein as barrier continuous sidewall "inner" side and "interior" side, barrier continuous sidewall "inner" surface, barrier continuous sidewall "interior" surface) facing into the aircraft window barrier interior. Barrier continuous sidewall 30 further comprises barrier continuous sidewall second side 30*b* (referred to equivalently herein as barrier continuous sidewall "outer" side, barrier continuous sidewall "outer" surface and barrier continuous sidewall "exterior" surface) facing outward and, in the aircraft window barrier installed position, facing the aircraft cabin sidewall of the aircraft cabin sidewall window recess.

Aircraft window barrier 24 further comprises at least one barrier continuous sidewall seal 30*d* that can be adhered to or that can be integral with barrier continuous sidewall second side 30*b* about barrier continuous sidewall outer perimeter 30*c*. As shown in FIG. 2, the barrier continuous sidewall outer perimeter 30*c* can change and have variable sidewall height "h" dimensions (e.g., height "h" values) along the barrier continuous sidewall width, to facilitate a snug "fit" of the aircraft window barrier 24 into the aircraft cabin sidewall window recess 20 (for example, when the aircraft window sidewall recess is tapered in dimension along the depth of the recess). As shown in FIG. 2, in one present example, the at least one barrier continuous sidewall seal 30*d* can coincide closely in dimension to and form an intimate seal at a location within the aircraft cabin sidewall recess (e.g., at an aircraft cabin sidewall window recess first or second inner perimeter 20*a1*, 20*a*, etc.).

Aircraft window barrier 24 further comprises barrier second wall 32, with barrier second wall comprising barrier second wall first side 32*a* (referred to equivalently herein as a barrier second wall "lower" side or barrier second wall "underside"), and barrier second wall second side 32*b*

(referred to equivalently herein as a barrier second wall "upper" side). Barrier second wall 32 further comprises barrier second wall first end 32c and barrier second wall second end 32d, with barrier second wall first and second ends 32c, 32d, respectively, configured to intimately contact the barrier continuous sidewall first side 30a of the barrier continuous sidewall 30. Barrier second wall 32 can be joined to, adhered to, affixed to, bonded to, and/or integral with barrier continuous sidewall first side 30a of the barrier continuous sidewall 30a and barrier base first side 26a.

According to present aspects, the aircraft window barrier base, the barrier continuous sidewall, and the barrier continuous sidewall seals can be made from a resilient material (e.g., plastic, silicone, rubber, foam, etc.) that can be at least slightly repeatably compressible and/or that can be slightly repeatably deformable, with the resilient material able to exert an outward force in the opposite direction of inwardly compressible forces to which the material is subjected. That is, according to a present aspect, the material selected for the present aircraft window barrier base, the barrier continuous sidewall, and the barrier continuous sidewall seal will not "crush" or permanently deform upon an initial compression. According to one present example, the material selected for the present aircraft window barrier base, barrier continuous sidewall, and the barrier continuous sidewall seals can possess the physical characteristics that allow the segments and assembly to be at least slightly compressed from an initial dimension into a compressed dimension. If the present aircraft window barrier is removed, repositioned, reused, etc., the barrier and barrier components can resiliently expand (e.g., in the absence of a compressive force) and return to a non-compressed dimension that, even after use, can be very close to, and that, in one present example, can be nearly identical to, the initial dimension.

In one present example, the present aircraft window barrier base, barrier continuous sidewall, the barrier second wall, and/or the barrier continuous sidewall seals (collectively referred to equivalently herein as the aircraft window barrier components) can be made from a material having a useful Young's modulus range. In a present example, when the aircraft window barrier components are additively manufactured, the material selected for use can comprise a polyethylene terephthalate glycol compound comprising a Young's modulus ranging from about 1.12 GPa to about 2.95 GPa. In another present example, the component parts of the aircraft window barrier are, for example, injection molded, with and can comprise polycarbonate (Young's modulus ranging from about 2.0 GPa to about 2.4 GPa); polypropylene (Young's modulus ranging from about 1.3 GPa to about 1.8 GPa); acrylonitrile butadiene styrene (Young's modulus ranging from about 1.9 GPa to about 2.5 GPa); high impact polystyrene (Young's of about 2.0; polyethylene (Young's modulus ranging from about 0.8 GPa to about 1.2 GPa).

In one present example, the barrier continuous sidewall seal can be made from a foam material that can be a closed cell foam material.

According to present aspects, a completely and imperviously sealed or integral surface is formed at: 1) the barrier base first side/barrier second wall interface; 2) the barrier continuous sidewall first side/barrier second wall first end interface; and 3) the barrier continuous sidewall first side/ second end interface. As shown more clearly in FIG. 3A, barrier second wall 32 comprises a barrier second wall thickness ("T1") extending from the barrier continuous sidewall first side 32a to the barrier second wall second side 32b.

Although perhaps not visible in FIG. 2, barrier second wall first side 32a faces a barrier cavity 34 (perhaps more visible at least in FIG. 3A, 4A, 4B, 4C), with a barrier cavity 34 formed and otherwise defined by barrier second wall first side 32a, at least a portion of barrier continuous sidewall first side 30a, and at least a portion of barrier base first side 26a, and the highly light-transmissive barrier base panel 28. According to one present variation, barrier cavity 34 comprises a barrier cavity footprint (e.g., length, width, height, volume) that is dimensioned and otherwise configured to removably receive, and removably house removable cartridge 40.

Removable cartridge 40 comprises a dimensional removable cartridge footprint 40a (e.g., footprint defined herein as a length×width×height dimension of volume, and/or three-dimensional area) that is configured to substantially match the barrier cavity footprint such that, in one example, removable cartridge 40 forms an intimate fit with barrier cavity 34 of aircraft window barrier 24 when removable cartridge 40 is inserted into and housed within barrier cavity 34. When removable cartridge 40 is in place within barrier cavity 34 of aircraft window barrier 24, removable cartridge 40 will be in intimate contact with barrier second wall first side 32a, barrier continuous side wall first side 30a, barrier base first side 26a, and highly light-transmissive barrier base panel 28. In one present example, removable cartridge 40 is an at least partially hollow cartridge containing a removable cartridge internal chamber 40b.

FIG. 3A is a partial front view (e.g., a view from within aircraft cabin 14 of aircraft 10 of the type shown in the FIGS.) showing aircraft window barrier 24 now installed (e.g., in an installed position) into aircraft cabin sidewall window recess 20 shown in FIG. 2, and with indicated and described parts herein similarly numbered. As shown in FIG. 3A, removable cartridge 40 comprises a cartridge base 42 (perhaps better visible in FIGS. 4A, 6) with cartridge walls 43 extending vertically from cartridge base perimeter, and cartridge cover 44 comprising cartridge cover first side 44a (equivalently referred to herein as cartridge cover "outer" or "exposed" surface) and cartridge cover second side 44b (referred to equivalently herein as cartridge cover interior side) that is not visible in FIG. 3A, with cartridge cover one-way through openings extending through the cartridge cover thickness from cartridge cover first side 44a to cartridge cover second side 44b. Removable cartridge 40 is further shown in FIGS. 4A, 4B, 4C, 5, 6, and described in greater detail herein.

FIG. 4A further shows barrier handle 48. Barrier handle 48 can be an integral handle that can be incorporated into aircraft window barrier as a unitary part of barrier continuous sidewall 30. In another present example, one or more parts of the aircraft window barrier can be additively manufactured to incorporate one or more or all of the separately disclosed parts (e.g., components) of the aircraft window barrier including, for example, the barrier base 26, the barrier continuous sidewall 30, the barrier continuous sidewall seal 30d, the barrier second wall 32, and the barrier handle 48; with the same or different materials used for the parts, or segments of the parts, and that can be incorporated into, in one present example, a substantially unitary aircraft window barrier construction when additively manufactured.

As stated herein, and according to one present example, aircraft window barrier 24 is dimensioned, and otherwise comprises an overall window barrier footprint configured to completely reside and otherwise occupy a space within the aircraft cabin sidewall window recess 20 such that the complete aircraft window barrier footprint will not impede or otherwise dimensionally interfere with the movement of a movable window cover 22 (referred to equivalently herein as a "movable window shade") from a stowed position (e.g., a stowed position that may be a concealed position allowing viewing through a window) to a deployed position (e.g., a fully or partially deployed position covering and fully or partially restricting viewing through a window).

FIG. 3B is a partial front view from within aircraft cabin 14 of aircraft 10 showing aircraft window barrier 24 now installed (e.g., in an installed position) into aircraft cabin sidewall window recess 20 shown in FIGS. 2 and 3A, and with indicated and described visible parts similarly numbered. FIG. 3B further shows movable window cover 22 moved into a movable window cover 22 substantially deployed position from a window cover stowed position with the majority of the present aircraft window barrier substantially covered (e.g., with only a portion of the removable cartridge 40 of the aircraft window barrier 24 visible.

FIG. 4A is a perspective and partially exploded side view of the present aircraft window barrier 24 of the type, according to present aspects, shown in FIGS. 2 and 3A, and with indicated and described visible parts similarly numbered, with the removable cartridge 40 shown disassembled from the aircraft window barrier 24 in a disassembled state (referred to equivalently herein as a "pre-assembled" state). That is, FIG. 4A shows the removable cartridge 40 removed and/or being inserted, and/or re-inserted into barrier cavity 34 of aircraft window barrier 24. Removable cartridge 40 comprises a removable cartridge base 42 having a removable cartridge base outer perimeter 42a. As stated herein, barrier cavity 34 is formed and otherwise defined by barrier second wall first side 32a, at least a portion of barrier continuous sidewall first side 30a, the highly light-transmissible base panel (not shown in FIG. 4A), and optionally at least a portion of barrier base first side 26a. Barrier cavity 34 comprises a barrier cavity inner perimeter that is substantially equivalent to the removable cartridge outer perimeter, with the barrier cavity 34 cavity footprint (e.g., length, width, height, volume) dimensioned to removably receive, and removably house removable cartridge 40 substantially completely with the barrier cavity 34.

Removable cartridge walls 43 can be four separate walls fixed and impermeably joined to one another and fixedly and impermeably joined to the cartridge base and the cartridge cover. In one present example, the four cartridge walls 43 can be one continuous wall that extends from removable cartridge base 42 and are adjoined to, or are integral with removable cartridge base 42 at or near removable cartridge base outer perimeter 42a. According to one present variation, a further "wall" in the form of the removable cartridge cover 44 is adjoined to or is integral with removable cartridge walls 43. Cartridge wall 43 cartridge base 42, and cartridge cover 44 combine to form and define removable cartridge internal chamber 40b.

In one present example, removable cartridge 40 comprises cartridge wall(s) 43 and cartridge base 42 that are impermeable. As mentioned herein, cartridge cover 44 comprises cartridge cover first side 44a (equivalently referred to herein as cartridge cover "outer" or "exposed" surface) and cartridge cover second side 44b (referred to equivalently herein as cartridge cover interior side) with cartridge cover one-way through openings 44c extending through the cartridge cover thickness from cartridge cover first side 44a to cartridge cover second side 44b.

As also shown in greater detail in FIG. 8 with respect to barrier cavity cover A44, (that is equivalent to the cartridge cover 44 for the present variation that comprises a removable cartridge) the cartridge cover one-way through openings 44c shown in FIG. 2, 3A, 3B, 4A (equivalent to the barrier cavity cover one-way through openings A44c) extend through the cartridge cover 44 and are dimensionally constructed and are otherwise configured to have a lager diameter at the cartridge cover first side 44a, and a smaller diameter at the cartridge cover second side 44b to form a frustoconical-shaped opening to allow and otherwise facilitate entry and passage of insects with the through opening tapered from the larger diameter at the cartridge cover first side to the smaller diameter at the cartridge cover second side; with the diameter of the one-way through-openings configured to exhibit a progressively narrower diameter through the cartridge cover thickness from the first side to the second side. Insects attracted by the light coming through the cartridge cover are induced to enter the through openings, travel along the narrowing length of the through opening as the insects pursue the light source, and the insects pass through the cartridge cover and enter into and become trapped within the cartridge internal chamber. The through openings are said to be one-way through openings as, in operation, the insects are not able to re-enter the one-way through opening and otherwise escape the internal chamber, as the smaller through opening in the cartridge cover second side facing into the internal chamber is a smaller diameter that will not accommodate entry of the insect back into the one-way through opening and out of the internal chamber via the one-way through opening.

FIG. 4B is a front view of the present aircraft window barrier 24 showing the barrier base 26 and the barrier base first side 26, the barrier continuous sidewall 30 and barrier continuous sidewall 30a, and the barrier second wall 32. Perhaps better visible in FIG. 4B, the barrier base 26 comprises barrier base cutout section 27 that is occupied by a highly light-transmissive barrier base panel 28 (that can be, for example, a "window") that largely and/or nearly completely occupies the area of, and serves as the back wall of, barrier cavity 34.

Barrier cavity 34, as shown in FIG. 4B, is defined by the highly light-transmissive barrier base panel 28, a portion of the barrier base first side 26a, a portion of the barrier continuous sidewall first side 30a, and the barrier second wall second side 32a. Barrier cavity 34 further comprises barrier cavity open end 34a and a barrier cavity open end inner perimeter 34b (shown as a "dotted line"). The barrier cavity open end inner perimeter 34b is substantially equivalent in dimension to the removable cartridge outer perimeter.

FIGS. 4B, 4C further show the barrier continuous sidewall seal 30d fixedly attached to or integral with the barrier continuous sidewall first (outer) side 30b, and with the barrier continuous sidewall seal 30d configured to extend about the perimeter of the aircraft window barrier 24, and in intimate contact with the perimeter of barrier continuous sidewall 30 at barrier continuous sidewall second side 30b. When removable cartridge 40 (not shown in FIG. 4B) is placed into position and is otherwise installed into barrier cavity 34 (e.g., to complete the assembly for the present aircraft window barrier 24), the cartridge base 42 is placed in intimate contact with barrier second wall first side 32a of barrier wall 32. FIG. 4C is a "back" view of the back side of the aircraft window barrier 24 showing the barrier window assembly features as shown in FIG. 4B, and numbered similarly FIG. 5 is an enlarged "top" view of the present barrier second wall 32 of the aircraft window barrier 24 showing barrier wall 32 intimately contacting barrier base first side 26 of barrier base, and with barrier second wall 32 further in intimate contact with barrier continuous sidewall first side 30a of barrier continuous sidewall 30. As further shown in FIG. 5, removable cartridge 40 is in position with barrier cavity 34 (not visible in FIG. 5).

FIG. 6 is a perspective "backside" view of removable cartridge 40 of the type shown in FIGS. 2, 3A, 3B, 4A, and 5, and with removable cartridge base 42 more clearly visible. As shown in FIG. 6, removable cartridge wall 43 is shown as one continuous wall 43 that extends from removable cartridge base 42 and is adjoined to, or is integral with removable cartridge base 42 at or near removable cartridge base outer perimeter 42a. A further "wall" in the form of a removable cartridge cover 44 is adjoined to or is integral with removable cartridge wall 43. Cartridge permeable wall 46 (comprising a plurality of cartridge permeable wall one-way through openings 46a) is shown adjoined to and/or can be integral with cartridge wall(s) 43, cartridge base 42, and cartridge cover 44 to form removable cartridge internal chamber 40b within removable cartridge 40.

According to present aspects, two (2) variations for the present aircraft window barrier are described herein. In one present variation and in one example, the aircraft window barrier comprises a highly-light transmissive removable cartridge configured to occupy the barrier cavity with the cartridge cover pf the removable cartridge comprising one-way through openings into the removable and replaceable cartridge. In another present variation, and in another present aspect, the present aircraft window barrier comprises a window aircraft barrier configuration that obviates the presence of a removable cartridge and, instead, incorporates a barrier cavity cover that can be similar to the cartridge cover, with the barrier cavity cover being made from a highly light-transmissive material, with the barrier cavity opening into the barrier cavity, and with no removable and/or replaceable cartridge in present and/or otherwise in communication with a cartridge. In a second present variation, the barrier cavity cover performs the function of and can be equivalent to the cartridge cover presented in the first variation when a removable cartridge is present, at least with respect to facilitating the attracting of insects to the aircraft window barrier and allowing passage into the aircraft window barrier cavity, and entrapping and otherwise retaining the traversing insects in the cavity.

FIGS. 7, 8, 9, 10, and 11 illustrate aspects of the present aircraft window barrier variation comprising a barrier cavity cover (and with the absence of an incorporated removable cartridge). As shown in a perspective view, FIG. 7, shows the present aircraft window barrier in a second variation comprising elements of the aircraft window barrier again incorporating the barrier base 26, the barrier continuous sidewall 30 and the barrier second wall 32, and barrier handle 48, and with the numbered features of these three elements being numbered similarly to the numbering for the aircraft window barrier 24 as shown in aircraft window barrier first variation in FIGS. 2, 3A, 3B, 4A, 4B, 4C, and 5, and 6.

As shown in FIG. 7, barrier second wall 32 further comprises a barrier second wall locking mechanism A32e (fixedly attached to or integral with the barrier second wall second side 32b or barrier second wall 32) that can be a female component of a locking mechanism that is configured to receive and mate with a "male" barrier cover locking tab A44d affixed to or integral with a barrier cavity cover A44 that is made from a highly light-transmissive barrier material. FIG. 7 further shows barrier cavity cover A44 locked into position to complete the enclosed barrier cavity 34 that is further defined by a portion of the barrier base first side 26a of barrier base 26, a portion of the barrier continuous sidewall first side 30a, barrier second wall second side 32a, and (as better shown in FIG. 9) highly light-transmissive base barrier panel 28. That is, the barrier cavity 34 (in an unenclosed state) for both present variations is substantially similarly defined. In the variation shown in FIGS. 7, 8, 9, 10, and 11, the barrier cavity cover A44b (the "inner" side) faces into the barrier cavity 34 and, in the installed and locked position, completes and seals the barrier cavity 34.

The barrier cavity cover A44 further comprises a barrier cover thickness extending from barrier cover first side A44a to barrier cover second side A44b, with barrier cover one-way through openings A44c extending through the barrier thickness of barrier cover A44. FIG. 8 is a cross-sectional side view of barrier cover A44 taken across lines 8-8 shown in FIG. 7. As shown in FIG. 8, the barrier cavity cover one-way through openings A44c are dimensionally constructed and are otherwise configured to have a lager through opening diameter at the barrier cavity cover first side A44a, and a smaller opening diameter at the barrier cavity cover second side A44b to form a frustoconical-shaped through opening to allow and otherwise facilitate entry and passage of insects with the through openings A44c tapered; with the diameter of the one-way through openings configured to exhibit a progressively narrower diameter through the barrier cavity cover thickness from the barrier cavity cover first side A44a toward barrier cavity cover second side A44b.

According to present aspects, insects attracted by the light coming through the barrier cavity cover A44 cover that is highly light-transmissive, are induced to enter the through openings A44c, travel down a narrowing through opening diameter as the insects pursue the light source, and with the insects passing through the cover, traversing the length of the through openings, and entering into and becoming trapped within the barrier cavity 34. The through openings are said to be one-way through openings as, in operation, the insects are not able to re-enter the through opening and otherwise escape the enclosed barrier cavity 34, as the smaller through opening in the barrier cavity cover second side A44b facing into the barrier cavity 34 is a smaller diameter that will not accommodate entry (e.g., "re-entry") and escape of the insect out from an entrapped location within the barrier cavity 34 enclosed state via the one-way through opening.

FIG. 9 is a perspective and partially exploded view of the "second" variation of the present aircraft window barrier 24 of the type shown in FIGS. 7, 8, with the aircraft window barrier 24 comprising similarly numbered. With the barrier cavity cover A44 removed from or not yet installed in aircraft window barrier 24, FIG. 9 presents a better view into barrier cavity open end 34a of barrier cavity 34 to reveal barrier cavity 34 bounded by and otherwise defined by: 1) barrier base highly light-transmissive barrier base panel 28 occupying the barrier base cutout section 27 in barrier base 26; 2) barrier continuous sidewall first side 30a; and barrier second wall 32b. Barrier cavity 34 is further shown comprising barrier base open end 34a comprising barrier base open end perimeter 34a (as a "dotted line").

Barrier cavity cover A44 comprises the elements shown in FIGS. 7 and 8 (with elements similarly numbered), with FIG. 9 further showing the barrier cover outer perimeter A44e (as a dotted line). In one present example, barrier cover outer perimeter A44e is substantially equivalent to barrier cavity open end inner perimeter 34a. When barrier cavity cover A44 is moved into position to seal barrier cavity 34, barrier cavity cover locking tab A44d is inserted into the recess located within barrier second wall locking mechanism A32e to maintain barrier cavity cover A44 in a locked and sealed configuration, effectively and completely sealing barrier cavity 34.

FIG. 10 is a "front" view of the second variation of the present aircraft window barrier 24 of the type illustrated in FIGS. 7, 8, 9, and as described herein, with elements shown in FIGS. 7, 8, and 9 similarly numbered. FIG. 10 is a "front" view of barrier cavity 24 showing barrier cavity cover A44 now in position in a locked state joined to aircraft window barrier 24 and inserted into locked position to enclose barrier chamber 34.

FIG. 11 is a "back" view of the second variation of the present aircraft window barrier 24 of the type illustrated in FIGS. 7, 8, 9, and 10, and as described herein, with elements shown in FIGS. 7, 8, 9, and 10 similarly numbered. FIG. 11 is a "back" view of barrier cavity 24 shown particularly in FIG. 9, with barrier cavity cover A44 disengaged from aircraft window barrier 24, with the "internal" side of barrier cavity cover A44 (e.g., barrier cavity cover second side, A44b) now visible. FIG. 11 further shows a better view of barrier base second side 26b (e.g., the barrier base back side) with barrier base cutout section 27 fully and sealably occupied by highly-light-transmissive barrier base panel 28.

According to present aspects, the presently disclosed aircraft window barrier of either presented variation can be installed into aircraft window cabin interiors during aircraft production, storage, delivery, and during aircraft non-flight phases, to form the presently disclosed aircraft window assembly for inhibiting debris present within an aircraft cabin environment from entering aircraft multi-pane window and other regions of an aircraft window assembly. The present aircraft window barriers are particularly useful during aircraft construction when, for example, debris in the form of foreign object debris (FOB) from aircraft construction processes can infiltrate an aircraft cabin environment of an aircraft under construction.

Foreign object debris, airborne particulate construction material (dust, dirt, etc.) and insects present in an aircraft cabin environment (e.g., under construction and in an aircraft construction environment) can infiltrate aircraft window assemblies from the cabin side via the inner windowpane through holes of an aircraft multi-pane window assembly. Once unwanted debris from the cabin side of an aircraft window assembly infiltrates the aircraft window assembly, significant production time, increased labor, schedule interruption, and overall increased production cost can ensue as window assemblies must be cleaned, disassembled, replaced, etc., to remove the unwanted debris.

The present aircraft window barrier of either presented variation, once installed into an aircraft cabin window recess, provides a physical barrier for the aircraft window assembly interiors (facing into the cabin) from dust, dirt, foreign object debris and other airborne particulate as such debris is completely physically blocked from entering the aircraft multi-pane window assembly via the windowpane through holes that function to alleviate condensation, assist in window clarity during pressurization/depressurization, etc.

According to present aspects, environmental debris in a cabin that could otherwise find entry into the multi-pane window assembly via the windowpane through openings is not only physically blocked by the implementation and installation of the present aircraft barrier into cabin window assemblies, but amounts of debris can be removed from the cabin environment and trapped within the present aircraft window barrier cavity (and, when present, in the removable cartridge that can be replaced and discarded when soiled).

In addition, the present aircraft window barrier of either variation for use in the present aircraft window assembly provides an active inducement and attraction for insects to migrate from an aircraft cabin environment into the present aircraft window barrier cavity. That is, according to present aspects, the aircraft window barrier is configured to establish a light transmissivity gradient and attracts insects into the barrier cavity (and, when present, into the removable cartridge), via the barrier cover one-way through openings, where the insects are induced to enter, and then become trapped and retained within the aircraft window barrier cavity.

The aircraft window barrier, according to present aspects, comprises an outer perimeter that is configured to closely match the dimension of the aircraft cabin sidewall window recess on the cabin side an aircraft window assembly. The aircraft window barrier in an installed state in the aircraft cabin sidewall window recess becomes a "plug" with the outer perimeter of the aircraft window barrier at least slightly compressed against the aircraft cabin sidewall inner perimeter. In addition, as explained herein, the inner windowpane through openings that could otherwise admit and collect debris (e.g. including insects that could become trapped and expire within the aircraft-multi-pane window) also become essentially "plugged" and/or otherwise blocked by the barrier base second side 26b of the barrier base 26 of the present aircraft window barrier 24.

In one present example, the presently disclosed aircraft window barrier base can include a translucent material and a section of highly light-transmissive material in the barrier base region that at least partially defines and otherwise aligns with the barrier cavity. In operation, the present aircraft window barrier will generally encounter (during aircraft production, storage, etc.) at least during daylight hours, a greater intensity of light (higher lumens) present at the aircraft exterior as compared to the light intensity within an aircraft cabin. As a result, the highly light-transmissive section of the barrier base and the barrier cavity cover will allow high light transmittance and attract insects that naturally pursue a light source.

According to present aspects, the present aircraft window barrier incorporates an intentionally induced and established light transmittance differential (referred to equivalently herein as a light transmittance gradient) between the light transmittance value of the materials selected to construct the highly light-transmissive barrier base panel, the highly light-transmissive barrier base panel (and, when present, the highly light-transmissive removable cartridge), the highly light-transmissive barrier cavity cover and the less light transmissive materials used in the formation of the barrier base panel, the barrier continuous sidewall, and the barrier second wall.

In one present example the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%.

According to present aspects, the present aircraft window barrier establishes a light transmittance gradient within the present aircraft window barrier device such that the barrier base cover (and the removable cartridge, when present) is significantly more highly light-transmissive than the remainder of the aircraft window barrier components, and can attract insects, induce the entry of insects from within the cabin environment, and retain entrapped insects within the barrier cavity via the barrier cavity cover one-way through opening. According to present aspects, once insects enter the barrier cavity, the trapped insects are unable to exit the aircraft window barrier cavity.

FIGS. 12, 13, 14, 15, and 16 are flowcharts outlining present methods according to present aspects, with the methods shown in FIGS. 12, 13, 14, 15, and 16 configured to employ, form, and/or install the present aircraft window barrier 24 shown at least in FIGS. 2, 3A, 3B 4A, 4B, 4C, 5, 6, 7, 8, 9, 10, and 11, and as described herein. The method outlined in FIG. 16 is configured to employ the present aircraft window barrier variation that incorporates the removable cartridge as shown at least in FIGS. 4A and 6.

FIG. 12 outlines a present aspect directed to a method 100 for impeding entry of unwanted debris into an aircraft multi-pane window during aircraft construction, aircraft storage, and aircraft non-flight phases, with the method 100 comprising installing 102 an aircraft window barrier of the type described herein into an aircraft window cabin sidewall window recess and adjacent to an inner windowpane of the aircraft multi-pane window to form an aircraft cabin window assembly comprising the present aircraft window barrier.

FIG. 13 outlines another present aspect directed to a method 200 for impeding entry of unwanted debris into an aircraft multi-pane window during aircraft construction, aircraft storage, and aircraft non-flight phases, with the method 200 comprising installing 102 an aircraft window barrier of the type described herein into an aircraft window cabin sidewall window recess and adjacent to an inner windowpane of the aircraft multi-pane window to form an aircraft cabin window assembly comprising the present aircraft window barrier. Method 200 further comprises establishing 104 a light transmittance gradient in the aircraft window barrier, and wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%.

FIG. 14 outlines another present aspect directed to a method 300 for impeding entry of unwanted debris into an aircraft multi-pane window during aircraft construction, aircraft storage, and aircraft non-flight phases, with the method 300 comprising installing 102 an aircraft window barrier of the type described herein into an aircraft window cabin sidewall window recess and adjacent to an inner windowpane of the aircraft multi-pane window to form an aircraft cabin window assembly comprising the present aircraft window barrier. Method 300 further comprises establishing 104 a light transmittance gradient in the aircraft window barrier, wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%, and attracting 106 environmental aircraft cabin debris into the present barrier cavity of the present aircraft window barrier.

FIG. 15 outlines another present aspect directed to a method 400 for impeding entry of unwanted debris into an aircraft multi-pane window during aircraft construction, aircraft storage, and aircraft non-flight phases, with the method 400 comprising installing 102 an aircraft window barrier of the type described herein into an aircraft window cabin sidewall window recess and adjacent to an inner window pane of the aircraft multi-pane window to form an aircraft cabin window assembly comprising the present aircraft window barrier. Method 400 further comprises establishing 104 a light transmittance gradient in the aircraft window barrier, wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%, attracting 106 environmental aircraft cabin debris into the present barrier cavity of the present aircraft window barrier, and retaining 108 environmental aircraft cabin debris into the present barrier cavity of the present aircraft window barrier present removable cartridge of the present aircraft window barrier FIG. 16 outlines another present aspect directed to a method 500 for impeding entry of unwanted debris into an aircraft multi-pane window during aircraft construction, aircraft storage, and aircraft non-flight phases, with method 500 comprising installing 102 an aircraft window barrier of the type described herein into an aircraft window cabin sidewall window recess and adjacent to an inner window pane of the aircraft multi-pane window to form an aircraft cabin window assembly comprising the present aircraft window barrier. Method 500 further comprises establishing 104 a light transmittance gradient in the aircraft window barrier, attracting 106 environmental aircraft cabin debris into the present removable cartridge of the present aircraft window barrier, wherein the barrier base comprises a light transmittance value ranging from about 0% to about 25%, the barrier continuous sidewall comprises a light transmittance value ranging from about 0% to about 25%, the barrier cavity cover comprises a light transmittance value ranging from about 25% to about 75%, and the highly light-transmissive barrier base panel comprises a light transmittance value ranging from about 50% to about 75%, and retaining 110 environmental aircraft cabin debris into the presently disclosed removable cartridge positioned within the barrier cavity of the present aircraft window barrier.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An aircraft window barrier for inhibiting entry of debris from an aircraft cabin into an aircraft multi-pane window comprising:

a barrier base, said barrier base comprising a barrier base first side, and a barrier base second side, a barrier base cutout section extending a portion of the barrier base first side to the barrier base second side, a light-transmissive barrier base panel dimensioned to occupy the barrier base cutout section, said barrier base further comprising a barrier base outer perimeter;

a barrier continuous sidewall, said barrier continuous sidewall extending outwardly from the barrier base first side, said barrier continuous sidewall comprising a barrier continuous sidewall first side, and a barrier continuous sidewall second side, said barrier continuous sidewall second side comprising a barrier continuous sidewall second side perimeter;

a barrier second wall extending from the barrier base first side, said barrier second wall comprising barrier second wall thickness extending from a barrier second wall first side to a barrier second wall second side, said barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side;

a barrier cavity, said barrier cavity bounded by a portion of the barrier base first side, a portion of the barrier continuous sidewall first side, the light-transmissive barrier base panel, and the barrier second wall first side, said barrier cavity comprising a barrier cavity open end and a barrier cavity open end perimeter;

a barrier cavity cover, said barrier cavity cover comprising a barrier cavity cover thickness extending from a barrier cavity cover first side to a barrier cavity cover second side, said barrier cavity cover comprising at least one barrier cavity cover one-way through opening extending through the barrier cavity cover thickness, said barrier cavity cover comprising a barrier cavity cover outer perimeter dimensioned to match the barrier cavity open end perimeter; and wherein said barrier base, said barrier continuous side wall, and said barrier second wall each comprise a first light transmittance value ranging from about 0% to about 25%, said barrier cavity cover and said light-transmissive barrier base panel each comprising a second light transmittance value ranging from about 25% to about 75%, said second transmittance value greater than the first light transmittance value.

2. The aircraft window barrier of claim 1, wherein the barrier cavity cover is a movable barrier cavity cover configured to move between an open position and a closed position.

3. The aircraft window barrier of claim 1, wherein the barrier cavity cover is removably engageable with the aircraft window barrier.

4. The aircraft window barrier of claim 1, wherein said light-transmissive barrier base panel comprising the second light transmittance value ranging from about 50% to about 75%.

5. The aircraft window barrier of claim 1, wherein said barrier base, the barrier continuous sidewall, and the barrier second wall are translucent.

6. The aircraft window barrier of claim 1, wherein said aircraft window barrier comprises an aircraft window barrier footprint configured to completely nest within an aircraft cabin window recess outer perimeter of an aircraft cabin window recess, wherein, when the aircraft window barrier is installed into the aircraft cabin window recess, said aircraft window barrier footprint is configured to facilitate movement of a movable window cover between a movable window stowed position and a movable window deployed position.

7. The aircraft window barrier of claim 1, wherein the barrier continuous sidewall second side perimeter comprises a barrier continuous sidewall seal, said barrier continuous sidewall seal comprising a compressible foam material.

8. The aircraft window barrier of claim 1, further comprising a removable cartridge, said removable cartridge dimensioned to be housed in an intimate fit within the barrier cavity, said removable cartridge comprising a cartridge base, said cartridge base comprising a cartridge base perimeter, a plurality of adjoining cartridge walls extending from the cartridge base perimeter of the cartridge base, said plurality of adjoining cartridge walls fixedly attached to the barrier cavity cover to form a cartridge cover, said cartridge cover comprising a cartridge cover perimeter, said cartridge cover perimeter configured to align with the cartridge base perimeter, with the plurality of cartridge walls sandwiched between the cartridge base and the cartridge cover to form the removable cartridge, said cartridge cover comprising a cartridge cover thickness extending from a cartridge cover first side to a cartridge cover second side, said cartridge cover comprising at least one cartridge cover one-way through opening extending through the cartridge cover thickness, said removable cartridge further comprising a removable cartridge footprint, said removable cartridge further comprising a removable cartridge internal chamber, said removable cartridge internal chamber defined by the cartridge base, the plurality of adjoining cartridge walls, and the cartridge cover, said removable cartridge footprint dimensioned to be received by the barrier cavity.

9. The aircraft window barrier of claim 8, wherein said removable cartridge footprint is dimensioned to be completely housed within the barrier cavity.

10. An aircraft comprising the aircraft window barrier of claim 1.

11. An aircraft comprising the aircraft window barrier of claim 8.

12. An aircraft window assembly for inhibiting entry of debris into an aircraft multi-pane window of an aircraft, said aircraft window assembly comprising:

an aircraft cabin sidewall recess comprising an aircraft cabin sidewall recess outer perimeter, said aircraft cabin sidewall recess bounding the aircraft multi-pane window, said aircraft multi-pane window comprising an inner windowpane, said inner windowpane comprising a plurality of inner windowpane through openings;

an aircraft window barrier comprising:

a barrier base, said barrier base comprising a barrier base first side, and a barrier base second side, a barrier base cutout section extending a portion of the barrier base first side to the barrier base second side, a light-transmissive barrier base panel dimensioned to occupy the barrier base cutout section, and a barrier base outer perimeter;

a barrier continuous sidewall, said barrier continuous sidewall extending outwardly from the barrier base first side, said barrier continuous sidewall comprising a barrier continuous sidewall first side, and a barrier continuous sidewall second side, said barrier continuous sidewall second side comprising a barrier continuous sidewall second side perimeter;

a barrier second wall extending from the barrier base first side, said barrier second wall comprising barrier second wall thickness extending from a barrier second wall first side to a barrier second wall second side, said barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side;

a barrier cavity, said barrier cavity bounded by a portion of the barrier base first side, a portion of the barrier continuous sidewall first side, the light transmissive barrier base panel, and the barrier second wall first side, said barrier cavity comprising a barrier cavity open end and a barrier cavity open end perimeter;

a barrier cavity cover, said barrier cavity cover comprising a barrier cavity cover thickness extending from a barrier cavity cover first side to a barrier cavity cover second side, said barrier cavity cover comprising at least one barrier cavity cover one-way through opening extending through the barrier cavity cover thickness, said barrier cavity cover comprising a barrier cavity cover outer perimeter dimensioned to match the barrier cavity open end perimeter; and wherein said barrier base, said barrier continuous sidewall, and said barrier second wall each comprise a first light transmittance value ranging from about 0% to about 25%, said barrier cavity cover and said light-transmissive barrier base panel each comprising a second light transmittance value ranging from about 25% to about 75%, said second transmittance value greater than the first light transmittance value.

13. The aircraft window assembly of claim 12, further comprising:

a removable cartridge, said removable cartridge dimensioned to be housed in an intimate fit within the barrier cavity, said removable cartridge comprising a cartridge base, said cartridge base comprising a cartridge base perimeter, a plurality of adjoining cartridge walls extending from the cartridge base perimeter of the cartridge base, said plurality of adjoining cartridge walls fixedly attached to the barrier cavity cover, to form a cartridge cover, said cartridge cover comprising a cartridge cover perimeter, said cartridge cover perimeter configured to align with the cartridge base perimeter, with the plurality of cartridge walls sandwiched between the cartridge base and the cartridge cover to form the removable cartridge, said cartridge cover comprising a cartridge cover thickness extending from a cartridge cover first side to a cartridge cover second side, said cartridge cover comprising at least one cartridge cover one-way through opening extending through the cartridge cover thickness, said removable cartridge further comprising a removable cartridge footprint, said removable cartridge further comprising a removable cartridge internal chamber, said removable cartridge internal chamber defined by the cartridge base, the plurality of adjoining cartridge walls, and the cartridge cover, said removable cartridge footprint dimensioned to be received by the barrier cavity.

14. The aircraft window assembly of claim 12, wherein said light-transmissive barrier base panel comprising the second light transmittance value ranging from about 50% to about 75%.

15. An aircraft comprising the aircraft window assembly of claim 12.

16. A method for impeding entry of unwanted debris into an aircraft multi-pane window during aircraft construction and aircraft storage, the method comprising:

installing an aircraft window barrier into an aircraft window cabin sidewall window recess and adjacent to an inner windowpane of an aircraft muti-pane window, said aircraft window barrier comprising:

a barrier base, said barrier base comprising a barrier base first side, a barrier base second side, a barrier base cutout section extending from a portion of the barrier base first side to the barrier base second side, a light-transmissive barrier base panel dimensioned to occupy the barrier base cutout section, and a barrier base outer perimeter;

a barrier continuous sidewall, said barrier continuous sidewall extending outwardly from the barrier base first side, said barrier continuous sidewall comprising a barrier continuous sidewall first side, and a barrier continuous sidewall second side, said barrier continuous sidewall second side comprising a barrier continuous sidewall second side perimeter;

a barrier second wall extending from the barrier base first side, said barrier second wall comprising barrier second wall thickness extending from a barrier second wall first side to a barrier second wall second side, said barrier second wall further comprising a barrier second wall first end and a barrier second wall second end extending a selected distance from the barrier second wall first end, said barrier second wall configured to extend laterally across the barrier base, with said barrier second wall first end and said barrier second wall second end contacting the barrier continuous sidewall first side; and a barrier cavity, said barrier cavity defined by a portion of the barrier base first side, a portion of the barrier continuous sidewall first side the light transmissive barrier base panel, and the barrier second wall first side, said barrier cavity comprising a barrier cavity open end and a barrier cavity open end perimeter;

a barrier cavity cover, said barrier cavity cover comprising a barrier cavity cover thickness extending from a barrier cavity cover first side to a barrier cover second side, said barrier cavity cover comprising at least one barrier cavity cover one-way through opening extending through the barrier cavity cover thickness, said barrier cavity cover comprising a barrier cavity cover outer perimeter dimensioned to match the barrier cavity open end perimeter, said barrier cavity cover dimensioned to be received in the barrier cavity open end in a barrier cavity cover closed position; and wherein said barrier base comprises a light transmittance value ranging from about 0% to about 25%, said barrier continuous sidewall comprises a light transmittance value ranging from about 0% to about 25%, said barrier cavity cover comprises a light transmittance value ranging from about 25% to about 75%, and said light-transmissive barrier base panel comprises a light transmittance value ranging from about 50% to about 75%.

17. The method of claim 16, further comprising:

establishing a light transmittance gradient in the barrier base, said barrier base comprising a first light transmittance value ranging from about 0% to about 25%, and said light-transmissive barrier base panel comprising a second light transmittance value ranging from about 50% to about 75%.

18. The method of claim 17, further comprising:

attracting unwanted debris from an aircraft cabin into the barrier cavity.

19. The method of claim 18, further comprising:

retaining in the barrier cavity unwanted debris attracted into the barrier cavity.

20. The method of claim 18, further comprising:

retaining in the barrier cavity unwanted debris attracted into a removable cartridge, said removable cartridge configured to substantially occupy the barrier cavity.

\* \* \* \* \*